US012634838B2

(12) United States Patent
Methenni et al.

(10) Patent No.: US 12,634,838 B2
(45) Date of Patent: May 19, 2026

(54) METHODS, APPARATUS, AND SYSTEMS FOR POWER STATUS REPORTING AND POWER OPTIMIZED SERVICE CONFIGURATION

(71) Applicant: InterDigital Patent Holdings, Inc., Wilmington, DE (US)

(72) Inventors: Achref Methenni, Montreal (CA); Michael Starsinic, Newtown, PA (US); Rocco Di Girolamo, Laval (CA); Xavier De Foy, Kirkland (CA); Magurawalage Chathura Madhusanka Sarathchandra, London (GB); Renan Krishna, Brighton (GB); Jaya Rao, Montreal (CA); Patrice Hirtzlin, Betton (FR); Saad Ahmad, Montreal (CA); Michelle Perras, Montreal (CA); Samir Ferdi, Kirkland (CA); Loic Fontaine, Noyal-sur-Vilaine (FR)

(73) Assignee: InterDigital Patent Holdings, Inc., Wilmington, DE (US)

( * ) Notice: Subject to any disclaimer, the term of this patent is extended or adjusted under 35 U.S.C. 154(b) by 306 days.

(21) Appl. No.: 18/478,559

(22) Filed: Sep. 29, 2023

(65) Prior Publication Data

US 2024/0114465 A1 Apr. 4, 2024

Related U.S. Application Data

(60) Provisional application No. 63/411,194, filed on Sep. 29, 2022.

(51) Int. Cl.
*H04W 24/10* (2009.01)
*H04W 52/36* (2009.01)

(52) U.S. Cl.
CPC ......... *H04W 52/365* (2013.01); *H04W 24/10* (2013.01)

(58) Field of Classification Search
CPC .... H04W 52/36; H04W 52/365; H04W 24/10
See application file for complete search history.

(56) References Cited

U.S. PATENT DOCUMENTS

| | | | | |
|---|---|---|---|---|
| 11,659,354 B2 * | 5/2023 | Kassir | .................. | G01S 5/0072 |
| | | | | 455/456.2 |
| 12,349,024 B2 * | 7/2025 | Kassir | .................. | H04W 4/023 |

(Continued)

FOREIGN PATENT DOCUMENTS

| | | | | |
|---|---|---|---|---|
| EP | 3254496 B1 * | 12/2019 | ........ | H04W 36/0061 |
| EP | 3857824 B1 * | 11/2024 | ........ | H04W 36/0094 |

(Continued)

OTHER PUBLICATIONS

"A technical look at 5G mobile device energy efficiency", Ericsson. com; https://www.ericsson.com/en/blog/2020/2/mobile-devices-and-energy-efficiency, retrieved Mar. 18, 2022, Feb. 27, 2020, 14 pages.

(Continued)

*Primary Examiner* — Hai V Nguyen
(74) *Attorney, Agent, or Firm* — Flaster Greenberg P.C.

(57) ABSTRACT

A wireless transmit/receive unit (WTRU) may receive a power reporting policy from a network node. The power reporting policy may include one or more triggers associated with sending a power status report. The WTRU may determine that a trigger of the one or more triggers associated with sending the power status report has been satisfied. The WTRU may send the power status report to the network node in accordance with the power reporting policy. The power status report may include power status information associated with the WTRU and/or an indication that indicates the determined trigger to send the power status report.

18 Claims, 9 Drawing Sheets

100

(56) References Cited

U.S. PATENT DOCUMENTS

| | | | | |
|---|---|---|---|---|
| 2012/0295650 | A1* | 11/2012 | Futaki ................. | H04L 41/0631 |
| | | | | 455/500 |
| 2022/0303721 | A1* | 9/2022 | Kassir ..................... | H04W 4/40 |
| 2023/0247386 | A1* | 8/2023 | Kassir ................... | G08G 1/161 |
| | | | | 455/456.2 |
| 2023/0319709 | A1* | 10/2023 | Puente Pestaña ..... | H04W 24/10 |
| | | | | 455/438 |

FOREIGN PATENT DOCUMENTS

| | | | | |
|---|---|---|---|---|
| WO | WO-2019231435 A1 * | 12/2019 | ........ | H04W 52/0261 |
| WO | WO-2020066890 A1 * | 4/2020 | ......... | H04L 43/0817 |

OTHER PUBLICATIONS

SP-22075 , "3rd Generation Partnership Project (3GPP)", "SID update on study on architecture enhancement for XR and media services", 3GPP TSG-SA Meeting #96, Jun. 7-10, 2022, 7 pages.

TR 22.847 V18.2.0 , "3rd Generation Partnership Project (3GPP)", Technical Specification Group Services and System Aspects; Study on supporting tactile and multi-modality communication services; Stage 1 (Release 18), Mar. 2022, 35 pages.

TS 23.503 V17.5.0 , "3rd Generation Partnership Project (3GPP)", Technical Specification Group Services and System Aspects; Policy and charging control framework for the 5G System (5GS); Stage 2 (Release 17), Mar. 2022, 22 pages.

\* cited by examiner

100

METHODS, APPARATUS, AND SYSTEMS FOR POWER STATUS REPORTING AND POWER OPTIMIZED SERVICE CONFIGURATION

CROSS-REFERENCE TO RELATED APPLICATION

This application claims priority to U.S. Provisional Patent Application No. 63/411,194 filed on Sep. 29, 2022, the entire contents of which are incorporated herein by reference.

BACKGROUND

Multi-modal data may be defined as input data from different kinds of devices and/or sensors or the output data to different kinds of destinations (e.g., one or more WTRUs) required for the same task or application. Multi-modal Data may include more than one Single-modal Data. There may be a strong dependency among each instance of Single-modal Data. Single-modal Data may be seen as one type of data.

A device or sensor that generates (e.g., sends) single-modal data may be a WTRU or may use a WTRU to send single-modal data to a network. Single-modal data may be sent to applications that are hosted on other WTRUs or applications that are hosted on network servers. A device or sensor that receives single-modal data may be a WTRU or the device or sensor may use a WTRU to receive single-modal data from a network. Single-modal data may be received from one or more applications that are hosted on other WTRUs or applications that are hosted on network servers.

A PDU Set is composed of one or more PDUs carrying the payload of one unit of information generated at the application level (e.g., a frame or video slice for XRM Services), which are of the same importance requirement at application layer. One or more PDUs in a PDU Set may be needed by the application layer to use the corresponding unit of information. In examples, the application layer may recover parts of the information unit, when some PDUs are missing. A multi-modal synchronization threshold may be defined as a maximum tolerable temporal separation of the onset of two stimuli, where a first stimuli is presented to one sense and a second stimuli is presented to another sense, such that the accompanying sensory objects are perceived as being synchronous. A synchronization threshold may be described herein as the maximum tolerable temporal separation between the transmission or reception of two flows.

SUMMARY

Methods and apparatuses are provided for power status reporting and power optimized service configuration. Methods and apparatuses are provided for provisioning power reporting policies in the wireless transmit/receive unit (WTRU) and WTRU behavior based on the power reporting policies. The power reporting policies may be WTRU-initiated and/or network-initiated. Methods and apparatuses are provided for network behavior based on a received WTRU power status.

A network device may receive a message that indicates an identifier of a WTRU and one or more parameters associated with a power status of the WTRU. The network device may generate a power reporting policy based on the received message. The power reporting policy may include one or more triggers associated with sending a power status report. The one or more triggers may include one or more of a battery level of the WTRU, an unplugged status of the WTRU, a temperature level of the WTRU, a bitrate parameter, and/or a start/stop of an application. The power reporting policy may further include a time when the WTRU can start power status reporting, a power status reporting frequency, and/or location information.

The network device may send the power reporting policy to the WTRU. The power reporting policy may be sent to the WTRU in response to receipt of a request received in a NAS message from the WTRU. The power reporting policy may be sent to the WTRU in a NAS message. The network device may receive the power status report from the WTRU in accordance with the power reporting policy. The power status report may include one or more battery characteristics associated with the WTRU. The power status report may further include one or more of a time left to fully charge, a time available for certain activities, a temperature level, a power mode, a last time the WTRU was plugged in, WTRU storage status, WTRU memory status, WTRU CPU load, power consumption information associated with one or more applications, rate of change of battery level, and/or a desired power consumption level. The network device may update one or more PCC rules based on the power status report.

A wireless transmit/receive unit (WTRU) may receive a power reporting policy from a network node. The power reporting policy may include one or more triggers associated with sending a power status report. The WTRU may receive one or more quality of service (QoS) rules from a session management function (SMF). The WTRU may determine that a trigger of the one or more triggers associated with sending the power status report has been satisfied. The WTRU may determine the trigger has been satisfied based on one or more of a type of traffic to be sent by the WTRU and/or a change of power status at the WTRU. The WTRU may determine how often to send the power status report. The WTRU may send the power status report to the network node in accordance with the power reporting policy. The power status report may include power status information associated with the WTRU and/or an indication that indicates the determined trigger to send the power status report. The WTRU may send the power status report based on one or more of: a battery level of the WTRU, an unplugged status of the WTRU, a temperature level of the WTRU, a time of day, a bitrate parameter, a start of an application, a stop of the application, the power status information associated with the WTRU, and/or a detection of a type of traffic.

The WTRU may send, to the network node, one or more of: a battery level of the WTRU, a capacity of the battery level of the WTRU, one or more characteristics of the battery of the WTRU, an indication of a time left to fully charge the battery of the WTRU, a temperature level of the battery of the WTRU, and/or a power mode of the WTRU.

The power reporting policy may include one or more triggers associated with stopping the power reporting policy, an indication of where the WTRU is to send the power status report, an indication of a type of content that the WTRU is to include in the power status report, and/or an indication of one or more actions to be taken by the WTRU based on the content of the power status report and/or based on the one or more triggers associated with sending the power status report.

The power reporting policy may include one or more triggers associated with stopping the power reporting policy. The WTRU may stop sending the power status report based on one or more of: a detection of a change of power status, a determination that the WTRU is plugged and/or is charging, a time of day, and/or a determination that the battery level of the WTRU is at and/or above a threshold.

The WTRU may send the power status report to a location indicated by the power reporting policy. The WTRU may send a request to the network node to receive the power reporting policy.

The power reporting policy may configure the WTRU for an extended and multimodal reality (XRM) service using one or more parameters associated with the power status information of the WTRU.

DETAILED DESCRIPTION

Figure 1A:
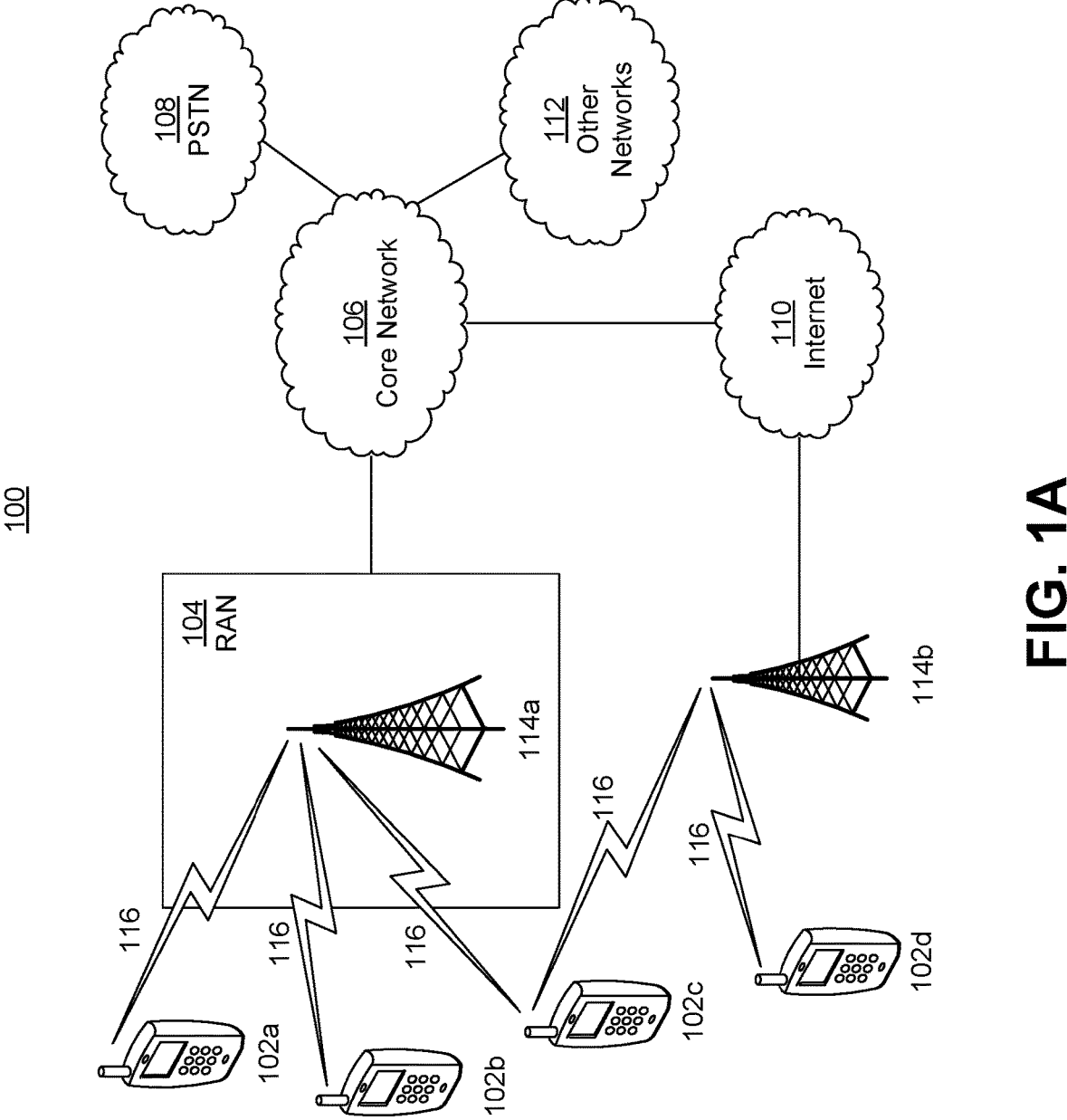
FIG. 1A is a system diagram illustrating an example communications system in which one or more disclosed embodiments may be implemented.

FIG. 1A is a diagram illustrating an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), zero-tail unique-word DFT-Spread OFDM (ZT UW DTS-s OFDM), unique word OFDM (UW-OFDM), resource block-filtered OFDM, filter bank multicarrier (FBMC), and the like.

As shown in FIG. 1A, the communications system 100 may include wireless transmit/receive units (WTRUs) 102a, 102b, 102c, 102d, a RAN 104/113, a CN 106/115, a public switched telephone network (PSTN) 108, the Internet 110, and other networks 112, though it will be appreciated that the disclosed embodiments contemplate any number of WTRUs, base stations, networks, and/or network elements.

Each of the WTRUs 102a, 102b, 102c, 102d may be any type of device configured to operate and/or communicate in a wireless environment. By way of example, the WTRUs 102a, 102b, 102c, 102d, any of which may be referred to as a "station" and/or a "STA", may be configured to transmit and/or receive wireless signals and may include a user equipment (UE), a mobile station, a fixed or mobile subscriber unit, a subscription-based unit, a pager, a cellular telephone, a personal digital assistant (PDA), a smartphone, a laptop, a netbook, a personal computer, a wireless sensor, a hotspot or Mi-Fi device, an Internet of Things (IoT) device, a watch or other wearable, a head-mounted display (HMD), a vehicle, a drone, a medical device and applications (e.g., remote surgery), an industrial device and applications (e.g., a robot and/or other wireless devices operating in an industrial and/or an automated processing chain contexts), a consumer electronics device, a device operating on commercial and/or industrial wireless networks, and the like. Any of the WTRUs 102a, 102b, 102c and 102d may be interchangeably referred to as a UE.

The communications systems 100 may also include a base station 114a and/or a base station 114b. Each of the base stations 114a, 114b may be any type of device configured to wirelessly interface with at least one of the WTRUs 102a, 102b, 102c, 102d to facilitate access to one or more communication networks, such as the CN 106/115, the Internet 110, and/or the other networks 112. By way of example, the base stations 114a, 114b may be a base transceiver station (BTS), a Node-B, an eNode B, a Home Node B, a Home eNode B, a gNB, a NR NodeB, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104/113, which may also include other base stations and/or network elements (not shown), such as a base station controller (BSC), a radio network controller (RNC), relay nodes, etc. The base station 114a and/or the base station 114b may be configured to transmit and/or receive wireless signals on one or more carrier frequencies, which may be referred to as a cell (not shown). These frequencies may be in licensed spectrum, unlicensed spectrum, or a combination of licensed and unlicensed spectrum. A cell may provide coverage for a wireless service to a specific geographical area that may be relatively fixed or that may change over time. The cell may further be divided into cell sectors. For example, the cell associated with the base station 114a may be divided into three sectors. Thus, in one embodiment, the base station 114a may include three transceivers, i.e., one for each sector of the cell. In an embodiment, the base station 114a may employ multiple-input multiple output (MIMO) technology and may utilize multiple transceivers for each sector of the cell. For example, beamforming may be used to transmit and/or receive signals in desired spatial directions.

The base stations 114a, 114b may communicate with one or more of the WTRUs 102a, 102b, 102c, 102d over an air interface 116, which may be any suitable wireless communication link (e.g., radio frequency (RF), microwave, centimeter wave, micrometer wave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104/113 and the WTRUs 102a, 102b, 102c may implement a radio technology such as Universal Mobile Telecommunications System (UMTS) Terrestrial Radio Access (UTRA), which may establish the air interface 115/116/117 using wideband CDMA (WCDMA). WCDMA may include communication protocols such as High-Speed Packet Access (HSPA) and/or Evolved HSPA (HSPA+). HSPA may include High-Speed Downlink (DL) Packet Access (HSDPA) and/or High-Speed UL Packet Access (HSUPA).

In an embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A) and/or LTE-Advanced Pro (LTE-A Pro).

In an embodiment, the base station 114a and the WTRUs 102a, 102b, 102c may implement a radio technology such as NR Radio Access , which may establish the air interface 116 using New Radio (NR).

In an embodiment, the base station 114a and the WTRUs 102a, 102b, 102c may implement multiple radio access technologies. For example, the base station 114a and the WTRUs 102a, 102b, 102c may implement LTE radio access and NR radio access together, for instance using dual connectivity (DC) principles. Thus, the air interface utilized by WTRUs 102a, 102b, 102c may be characterized by multiple types of radio access technologies and/or transmissions sent to/from multiple types of base stations (e.g., an eNB and a gNB).

In other embodiments, the base station 114a and the WTRUs 102a, 102b, 102c may implement radio technologies such as IEEE 802.11 (i.e., Wireless Fidelity (WiFi), IEEE 802.16 (i.e., Worldwide Interoperability for Microwave Access (WiMAX)), CDMA2000, CDMA2000 1x, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, an industrial facility, an air corridor (e.g., for use by drones), a roadway, and the like. In one embodiment, the base station 114b and the WTRUs 102c, 102d may implement a radio technology such as IEEE 802.11 to establish a wireless local area network (WLAN). In an embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, LTE-A Pro, NR etc.) to establish a picocell or femtocell. As shown in FIG. 1A, the base station 114b may have a direct connection to the Internet 110. Thus, the base station 114b may not be required to access the Internet 110 via the CN 106/115.

The RAN 104/113 may be in communication with the CN 106/115, which may be any type of network configured to provide voice, data, applications, and/or voice over internet protocol (VoIP) services to one or more of the WTRUs 102a, 102b, 102c, 102d. The data may have varying quality of service (QoS) requirements, such as differing throughput requirements, latency requirements, error tolerance requirements, reliability requirements, data throughput requirements, mobility requirements, and the like. The CN 106/115 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104/113 and/or the CN 106/115 may be in direct or indirect communication with other RANs that employ the same RAT as the RAN 104/113 or a different RAT. For example, in addition to being connected to the RAN 104/113, which may be utilizing a NR radio technology, the CN 106/115 may also be in communication with another RAN (not shown) employing a GSM, UMTS, CDMA 2000, WiMAX, E-UTRA, or WiFi radio technology.

The CN 106/115 may also serve as a gateway for the WTRUs 102a, 102b, 102c, 102d to access the PSTN 108, the Internet 110, and/or the other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and/or the internet protocol (IP) in the TCP/IP internet protocol suite. The networks 112 may include wired and/or wireless communications networks owned and/or operated by other service providers. For example, the networks 112 may include another CN connected to one or more RANs, which may employ the same RAT as the RAN 104/113 or a different RAT.

Some or all of the WTRUs 102a, 102b, 102c, 102d in the communications system 100 may include multi-mode capabilities (e.g., the WTRUs 102a, 102b, 102c, 102d may include multiple transceivers for communicating with different wireless networks over different wireless links). For example, the WTRU 102c shown in FIG. 1A may be configured to communicate with the base station 114a, which may employ a cellular-based radio technology, and with the base station 114b, which may employ an IEEE 802 radio technology.

Figure 1B:
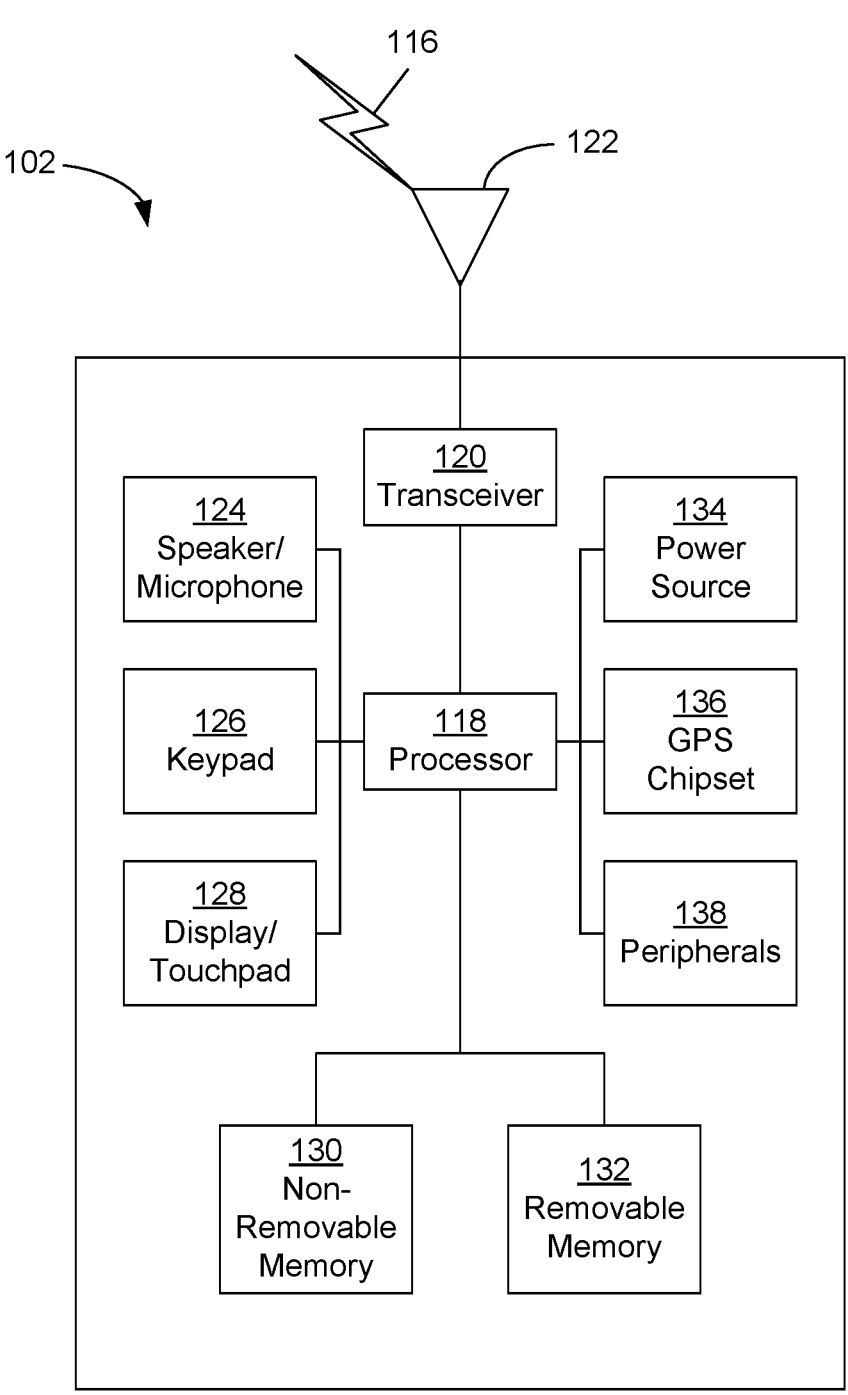
FIG. 1B is a system diagram illustrating an example wireless transmit/receive unit (WTRU) that may be used within the communications system illustrated in FIG. 1A according to an embodiment.

FIG. 1B is a system diagram illustrating an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 130, removable memory 132, a power source 134, a global positioning system (GPS) chipset 136, and/or other peripherals 138, among others. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114*a*) over the air interface 116. For example, in one embodiment, the transmit/receive element 122 may be an antenna configured to transmit and/or receive RF signals. In an embodiment, the transmit/receive element 122 may be an emitter/detector configured to transmit and/or receive IR, UV, or visible light signals, for example. In yet another embodiment, the transmit/receive element 122 may be configured to transmit and/or receive both RF and light signals. It will be appreciated that the transmit/receive element 122 may be configured to transmit and/or receive any combination of wireless signals.

Although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as NR and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 130 and/or the removable memory 132. The non-removable memory 130 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114*a,* 114*b*) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs and/or video), a universal serial bus (USB) port, a vibration device, a television transceiver, a hands free headset, a Bluetooth® module, a frequency modulated (FM) radio unit, a digital music player, a media player, a video game player module, an Internet browser, a Virtual Reality and/or Augmented Reality (VR/AR) device, an activity tracker, and the like. The peripherals 138 may include one or more sensors, the sensors may be one or more of a gyroscope, an accelerometer, a hall effect sensor, a magnetometer, an orientation sensor, a proximity sensor, a temperature sensor, a time sensor; a geolocation sensor; an altimeter, a light sensor, a touch sensor, a magnetometer, a barometer, a gesture sensor, a biometric sensor, and/or a humidity sensor.

The WTRU 102 may include a full duplex radio for which transmission and reception of some or all of the signals (e.g., associated with particular subframes for both the UL (e.g., for transmission) and downlink (e.g., for reception) may be concurrent and/or simultaneous. The full duplex radio may include an interference management unit 139 to reduce and or substantially eliminate self-interference via either hardware (e.g., a choke) or signal processing via a processor (e.g., a separate processor (not shown) or via processor 118). In an embodiment, the WTRU 102 may include a half-duplex radio for which transmission and reception of some or all of the signals (e.g., associated with particular subframes for either the UL (e.g., for transmission) or the downlink (e.g., for reception)).

Figure 1C:
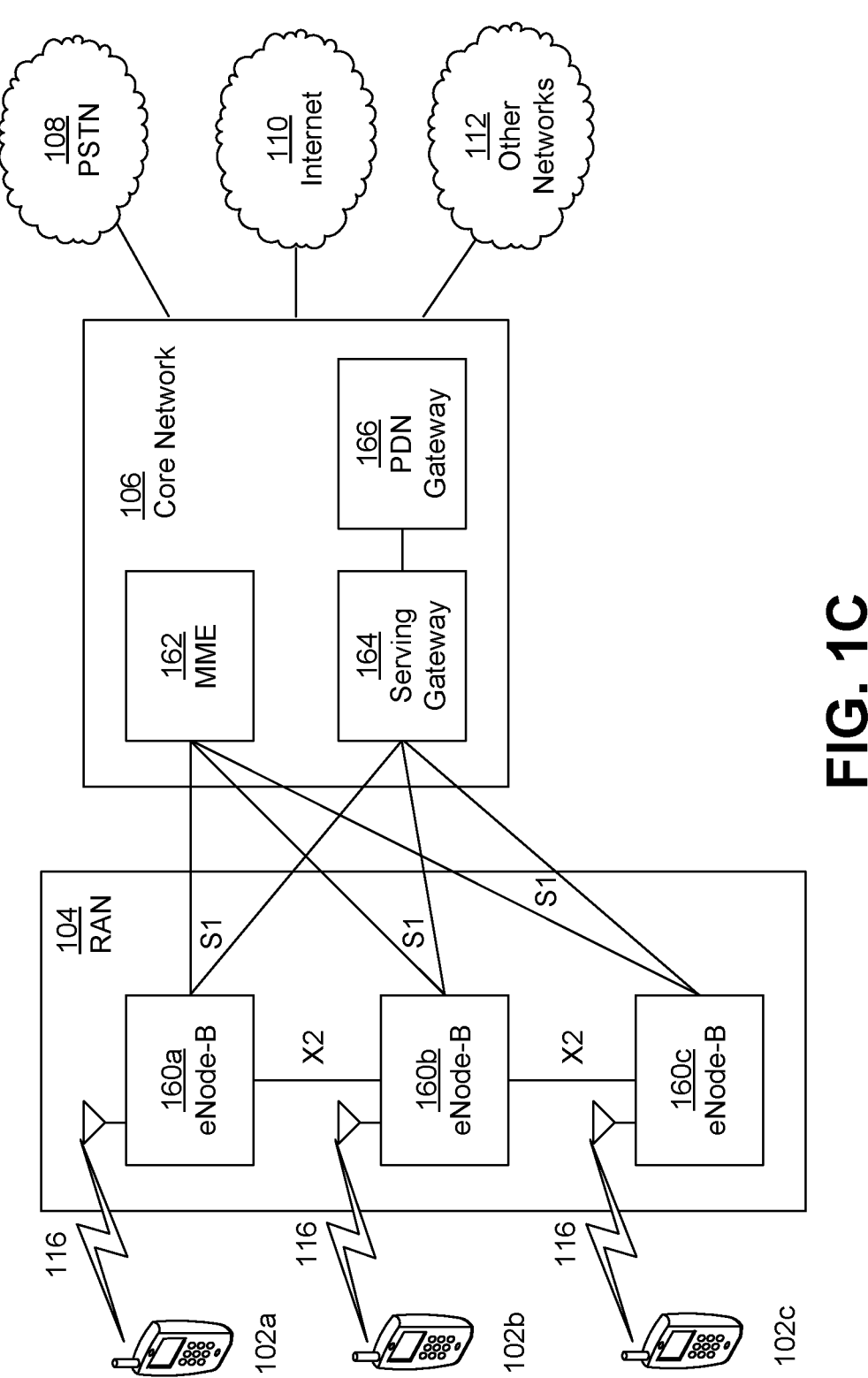
FIG. 1C is a system diagram illustrating an example radio access network (RAN) and an example core network (CN) that may be used within the communications system illustrated in FIG. 1A according to an embodiment.

FIG. 1C is a system diagram illustrating the RAN 104 and the CN 106 according to an embodiment. As noted above, the RAN 104 may employ an E-UTRA radio technology to communicate with the WTRUs 102*a,* 102*b,* 102*c* over the air interface 116. The RAN 104 may also be in communication with the CN 106.

The RAN 104 may include eNode-Bs 160*a,* 160*b,* 160*c,* though it will be appreciated that the RAN 104 may include any number of eNode-Bs while remaining consistent with an embodiment. The eNode-Bs 160*a,* 160*b,* 160*c* may each include one or more transceivers for communicating with the WTRUs 102*a,* 102*b,* 102*c* over the air interface 116. In one embodiment, the eNode-Bs 160*a,* 160*b,* 160*c* may implement MIMO technology. Thus, the eNode-B 160*a,* for example, may use multiple antennas to transmit wireless signals to, and/or receive wireless signals from, the WTRU 102*a*.

Each of the eNode-Bs 160*a,* 160*b,* 160*c* may be associated with a particular cell (not shown) and may be configured to handle radio resource management decisions, handover decisions, scheduling of users in the UL and/or DL, and the like. As shown in FIG. 1C, the eNode-Bs 160*a,* 160*b,* 160*c* may communicate with one another over an X2 interface.

The CN 106 shown in FIG. 1C may include a mobility management entity (MME) 162, a serving gateway (SGW) 164, and a packet data network (PDN) gateway (or PGW) 166. While each of the foregoing elements are depicted as part of the CN 106, it will be appreciated that any of these elements may be owned and/or operated by an entity other than the CN operator.

The MME 162 may be connected to each of the eNode-Bs 162a, 162b, 162c in the RAN 104 via an S1 interface and may serve as a control node. For example, the MME 162 may be responsible for authenticating users of the WTRUs 102a, 102b, 102c, bearer activation/deactivation, selecting a particular serving gateway during an initial attach of the WTRUs 102a, 102b, 102c, and the like. The MME 162 may provide a control plane function for switching between the RAN 104 and other RANs (not shown) that employ other radio technologies, such as GSM and/or WCDMA.

The SGW 164 may be connected to each of the eNode Bs 160a, 160b, 160c in the RAN 104 via the S1 interface. The SGW 164 may generally route and forward user data packets to/from the WTRUs 102a, 102b, 102c. The SGW 164 may perform other functions, such as anchoring user planes during inter-eNode B handovers, triggering paging when DL data is available for the WTRUs 102a, 102b, 102c, managing and storing contexts of the WTRUs 102a, 102b, 102c, and the like.

The SGW 164 may be connected to the PGW 166, which may provide the WTRUs 102a, 102b, 102c with access to packet-switched networks, such as the Internet 110, to facilitate communications between the WTRUs 102a, 102b, 102c and IP-enabled devices.

The CN 106 may facilitate communications with other networks. For example, the CN 106 may provide the WTRUs 102a, 102b, 102c with access to circuit-switched networks, such as the PSTN 108, to facilitate communications between the WTRUs 102a, 102b, 102c and traditional land-line communications devices. For example, the CN 106 may include, or may communicate with, an IP gateway (e.g., an IP multimedia subsystem (IMS) server) that serves as an interface between the CN 106 and the PSTN 108. In addition, the CN 106 may provide the WTRUs 102a, 102b, 102c with access to the other networks 112, which may include other wired and/or wireless networks that are owned and/or operated by other service providers.

Although the WTRU is described in FIGS. 1A-1D as a wireless terminal, it is contemplated that in certain representative embodiments that such a terminal may use (e.g., temporarily or permanently) wired communication interfaces with the communication network.

In representative embodiments, the other network 112 may be a WLAN.

A WLAN in Infrastructure Basic Service Set (BSS) mode may have an Access Point (AP) for the BSS and one or more stations (STAs) associated with the AP. The AP may have an access or an interface to a Distribution System (DS) or another type of wired/wireless network that carries traffic in to and/or out of the BSS. Traffic to STAs that originates from outside the BSS may arrive through the AP and may be delivered to the STAs. Traffic originating from STAs to destinations outside the BSS may be sent to the AP to be delivered to respective destinations. Traffic between STAs within the BSS may be sent through the AP, for example, where the source STA may send traffic to the AP and the AP may deliver the traffic to the destination STA. The traffic between STAs within a BSS may be considered and/or referred to as peer-to-peer traffic. The peer-to-peer traffic may be sent between (e.g., directly between) the source and destination STAs with a direct link setup (DLS). In certain representative embodiments, the DLS may use an 802.11e DLS or an 802.11z tunneled DLS (TDLS). A WLAN using an Independent BSS (IBSS) mode may not have an AP, and the STAs (e.g., all of the STAs) within or using the IBSS may communicate directly with each other. The IBSS mode of communication may sometimes be referred to herein as an "ad-hoc" mode of communication.

When using the 802.11ac infrastructure mode of operation or a similar mode of operations, the AP may transmit a beacon on a fixed channel, such as a primary channel. The primary channel may be a fixed width (e.g., 20 MHz wide bandwidth) or a dynamically set width via signaling. The primary channel may be the operating channel of the BSS and may be used by the STAs to establish a connection with the AP. In certain representative embodiments, Carrier Sense Multiple Access with Collision Avoidance (CSMA/CA) may be implemented, for example in in 802.11 systems. For CSMA/CA, the STAs (e.g., every STA), including the AP, may sense the primary channel. If the primary channel is sensed/detected and/or determined to be busy by a particular STA, the particular STA may back off. One STA (e.g., only one station) may transmit at any given time in a given BSS.

High Throughput (HT) STAs may use a 40 MHz wide channel for communication, for example, via a combination of the primary 20 MHz channel with an adjacent or nonadjacent 20 MHz channel to form a 40 MHz wide channel.

Very High Throughput (VHT) STAs may support 20 MHz, 40 MHz, 80 MHz, and/or 160 MHz wide channels. The 40 MHz, and/or 80 MHz, channels may be formed by combining contiguous 20 MHz channels. A 160 MHz channel may be formed by combining 8 contiguous 20 MHz channels, or by combining two non-contiguous 80 MHz channels, which may be referred to as an 80+80 configuration. For the 80+80 configuration, the data, after channel encoding, may be passed through a segment parser that may divide the data into two streams. Inverse Fast Fourier Transform (IFFT) processing, and time domain processing, may be done on each stream separately. The streams may be mapped on to the two 80 MHz channels, and the data may be transmitted by a transmitting STA. At the receiver of the receiving STA, the above described operation for the 80+80 configuration may be reversed, and the combined data may be sent to the Medium Access Control (MAC).

Sub 1 GHz modes of operation are supported by 802.11af and 802.11ah. The channel operating bandwidths, and carriers, are reduced in 802.11af and 802.11ah relative to those used in 802.11n, and 802.11ac. 802.11af supports 5 MHz, 10 MHz and 20 MHz bandwidths in the TV White Space (TVWS) spectrum, and 802.11ah supports 1 MHz, 2 MHz, 4 MHz, 8 MHz, and 16 MHz bandwidths using non-TVWS spectrum. According to a representative embodiment, 802.11ah may support Meter Type Control/Machine-Type Communications, such as MTC devices in a macro coverage area. MTC devices may have certain capabilities, for example, limited capabilities including support for (e.g., only support for) certain and/or limited bandwidths. The MTC devices may include a battery with a battery life above a threshold (e.g., to maintain a very long battery life).

WLAN systems, which may support multiple channels, and channel bandwidths, such as 802.11 n, 802.11ac, 802.11af, and 802.11ah, include a channel which may be designated as the primary channel. The primary channel may have a bandwidth equal to the largest common operating bandwidth supported by all STAs in the BSS. The bandwidth of the primary channel may be set and/or limited by a STA, from among all STAs in operating in a BSS, which supports the smallest bandwidth operating mode. In the example of 802.11ah, the primary channel may be 1 MHz wide for STAs (e.g., MTC type devices) that support (e.g., only support) a 1 MHz mode, even if the AP, and other STAs in the BSS support 2 MHz, 4 MHz, 8 MHz, 16 MHz, and/or other channel bandwidth operating modes. Carrier sensing and/or Network Allocation Vector (NAV) settings may depend on the status of the primary channel. If the primary channel is busy, for example, due to a STA (which supports only a 1 MHz operating mode), transmitting to the AP, the entire available frequency bands may be considered busy even though a majority of the frequency bands remains idle and may be available.

In the United States, the available frequency bands, which may be used by 802.11ah, are from 902 MHz to 928 MHz. In Korea, the available frequency bands are from 917.5 MHz to 923.5 MHz. In Japan, the available frequency bands are from 916.5 MHz to 927.5 MHz. The total bandwidth available for 802.11ah is 6 MHz to 26 MHz depending on the country code.

Figure 1D:
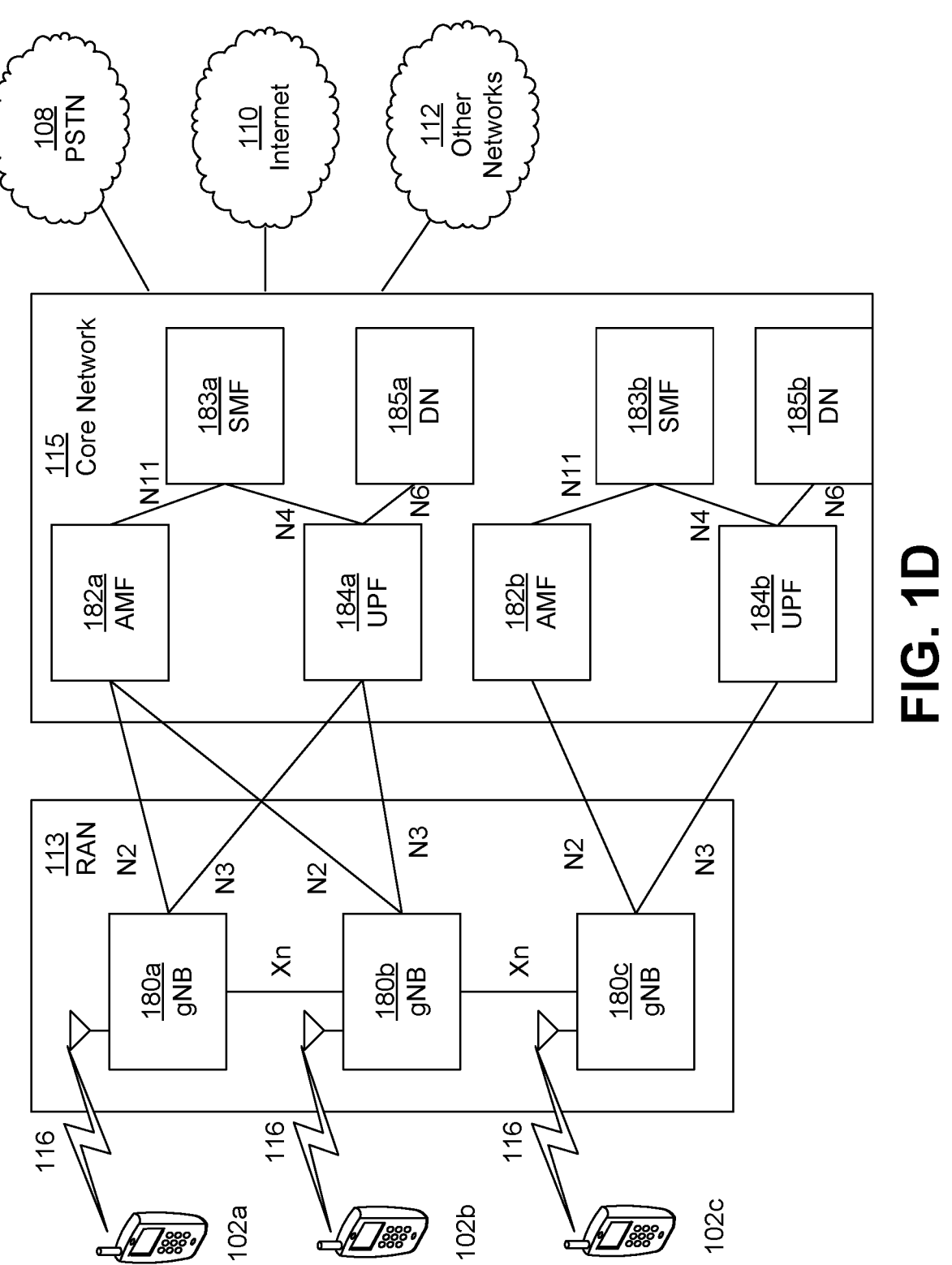
FIG. 1D is a system diagram illustrating a further example radio access network (RAN) and a further example CN that may be used within the communications system illustrated in FIG. 1A according to an embodiment.

FIG. 1D is a system diagram illustrating the RAN 113 and the CN 115 according to an embodiment. As noted above, the RAN 113 may employ an NR radio technology to communicate with the WTRUs 102a, 102b, 102c over the air interface 116. The RAN 113 may also be in communication with the CN 115.

The RAN 113 may include gNBs 180a, 180b, 180c, though it will be appreciated that the RAN 113 may include any number of gNBs while remaining consistent with an embodiment. The gNBs 180a, 180b, 180c may each include one or more transceivers for communicating with the WTRUs 102a, 102b, 102c over the air interface 116. In one embodiment, the gNBs 180a, 180b, 180c may implement MIMO technology. For example, gNBs 180a, 108b may utilize beamforming to transmit signals to and/or receive signals from the gNBs 180a, 180b, 180c. Thus, the gNB 180a, for example, may use multiple antennas to transmit wireless signals to, and/or receive wireless signals from, the WTRU 102a. In an embodiment, the gNBs 180a, 180b, 180c may implement carrier aggregation technology. For example, the gNB 180a may transmit multiple component carriers to the WTRU 102a (not shown). A subset of these component carriers may be on unlicensed spectrum while the remaining component carriers may be on licensed spectrum. In an embodiment, the gNBs 180a, 180b, 180c may implement Coordinated Multi-Point (CoMP) technology. For example, WTRU 102a may receive coordinated transmissions from gNB 180a and gNB 180b (and/or gNB 180c).

The WTRUs 102a, 102b, 102c may communicate with gNBs 180a, 180b, 180c using transmissions associated with a scalable numerology. For example, the OFDM symbol spacing and/or OFDM subcarrier spacing may vary for different transmissions, different cells, and/or different portions of the wireless transmission spectrum. The WTRUs 102a, 102b, 102c may communicate with gNBs 180a, 180b, 180c using subframe or transmission time intervals (TTIs) of various or scalable lengths (e.g., including varying number of OFDM symbols and/or lasting varying lengths of absolute time).

The gNBs 180a, 180b, 180c may be configured to communicate with the WTRUs 102a, 102b, 102c in a standalone configuration and/or a non-standalone configuration. In the standalone configuration, WTRUs 102a, 102b, 102c may communicate with gNBs 180a, 180b, 180c without also accessing other RANs (e.g., such as eNode-Bs 160a, 160b, 160c). In the standalone configuration, WTRUs 102a, 102b, 102c may utilize one or more of gNBs 180a, 180b, 180c as a mobility anchor point. In the standalone configuration, WTRUs 102a, 102b, 102c may communicate with gNBs 180a, 180b, 180c using signals in an unlicensed band. In a non-standalone configuration WTRUs 102a, 102b, 102c may communicate with/connect to gNBs 180a, 180b, 180c while also communicating with/connecting to another RAN such as eNode-Bs 160a, 160b, 160c. For example, WTRUs 102a, 102b, 102c may implement DC principles to communicate with one or more gNBs 180a, 180b, 180c and one or more eNode-Bs 160a, 160b, 160c substantially simultaneously. In the non-standalone configuration, eNode-Bs 160a, 160b, 160c may serve as a mobility anchor for WTRUs 102a, 102b, 102c and gNBs 180a, 180b, 180c may provide additional coverage and/or throughput for servicing WTRUs 102a, 102b, 102c.

Each of the gNBs 180a, 180b, 180c may be associated with a particular cell (not shown) and may be configured to handle radio resource management decisions, handover decisions, scheduling of users in the UL and/or DL, support of network slicing, dual connectivity, interworking between NR and E-UTRA, routing of user plane data towards User Plane Function (UPF) 184a, 184b, routing of control plane information towards Access and Mobility Management Function (AMF) 182a, 182b and the like. As shown in FIG. 1D, the gNBs 180a, 180b, 180c may communicate with one another over an Xn interface.

The CN 115 shown in FIG. 1D may include at least one AMF 182a, 182b, at least one UPF 184a, 184b, at least one Session Management Function (SMF) 183a, 183b, and possibly a Data Network (DN) 185a, 185b. While each of the foregoing elements are depicted as part of the CN 115, it will be appreciated that any of these elements may be owned and/or operated by an entity other than the CN operator.

The AMF 182a, 182b may be connected to one or more of the gNBs 180a, 180b, 180c in the RAN 113 via an N2 interface and may serve as a control node. For example, the AMF 182a, 182b may be responsible for authenticating users of the WTRUs 102a, 102b, 102c, support for network slicing (e.g., handling of different PDU sessions with different requirements), selecting a particular SMF 183a, 183b, management of the registration area, termination of NAS signaling, mobility management, and the like. Network slicing may be used by the AMF 182a, 182b in order to customize CN support for WTRUs 102a, 102b, 102c based on the types of services being utilized WTRUs 102a, 102b, 102c. For example, different network slices may be established for different use cases such as services relying on ultra-reliable low latency (URLLC) access, services relying on enhanced massive mobile broadband (eMBB) access, services for machine type communication (MTC) access, and/or the like. The AMF 162 may provide a control plane function for switching between the RAN 113 and other RANs (not shown) that employ other radio technologies, such as LTE, LTE-A, LTE-A Pro, and/or non-3GPP access technologies such as WiFi.

The SMF 183a, 183b may be connected to an AMF 182a, 182b in the CN 115 via an N11 interface. The SMF 183a, 183b may also be connected to a UPF 184a, 184b in the CN 115 via an N4 interface. The SMF 183a, 183b may select and control the UPF 184a, 184b and configure the routing of traffic through the UPF 184a, 184b. The SMF 183a, 183b may perform other functions, such as managing and allocating WTRU address, managing PDU sessions, controlling policy enforcement and QoS, providing downlink data notifications, and the like. A PDU session type may be IP-based, non-IP based, Ethernet-based, and the like.

The UPF 184a, 184b may be connected to one or more of the gNBs 180a, 180b, 180c in the RAN 113 via an N3 interface, which may provide the WTRUs 102a, 102b, 102c with access to packet-switched networks, such as the Internet 110, to facilitate communications between the WTRUs 102a, 102b, 102c and IP-enabled devices. The UPF 184, 184b may perform other functions, such as routing and forwarding packets, enforcing user plane policies, supporting multi-homed PDU sessions, handling user plane QoS, buffering downlink packets, providing mobility anchoring, and the like.

The CN 115 may facilitate communications with other networks. For example, the CN 115 may include, or may communicate with, an IP gateway (e.g., an IP multimedia subsystem (IMS) server) that serves as an interface between the CN 115 and the PSTN 108. In addition, the CN 115 may provide the WTRUs 102a, 102b, 102c with access to the other networks 112, which may include other wired and/or wireless networks that are owned and/or operated by other service providers. In one embodiment, the WTRUs 102a, 102b, 102c may be connected to a local Data Network (DN) 185a, 185b through the UPF 184a, 184b via the N3 interface to the UPF 184a, 184b and an N6 interface between the UPF 184a, 184b and the DN 185a, 185b.

In view of FIGS. 1A-1D, and the corresponding description of FIGS. 1A-1D, one or more, or all, of the functions described herein with regard to one or more of: WTRU 102a-d, Base Station 114a-b, eNode-B 160a-c, MME 162, SGW 164, PGW 166, gNB 180a-c, AMF 182a-ab, UPF 184a-b, SMF 183a-b, DN 185a-b, and/or any other device(s) described herein, may be performed by one or more emulation devices (not shown). The emulation devices may be one or more devices configured to emulate one or more, or all, of the functions described herein. For example, the emulation devices may be used to test other devices and/or to simulate network and/or WTRU functions.

The emulation devices may be designed to implement one or more tests of other devices in a lab environment and/or in an operator network environment. For example, the one or more emulation devices may perform the one or more, or all, functions while being fully or partially implemented and/or deployed as part of a wired and/or wireless communication network in order to test other devices within the communication network. The one or more emulation devices may perform the one or more, or all, functions while being temporarily implemented/deployed as part of a wired and/or wireless communication network. The emulation device may be directly coupled to another device for purposes of testing and/or may performing testing using over-the-air wireless communications.

The one or more emulation devices may perform the one or more, including all, functions while not being implemented/deployed as part of a wired and/or wireless communication network. For example, the emulation devices may be utilized in a testing scenario in a testing laboratory and/or a non-deployed (e.g., testing) wired and/or wireless communication network in order to implement testing of one or more components. The one or more emulation devices may be test equipment. Direct RF coupling and/or wireless communications via RF circuitry (e.g., which may include one or more antennas) may be used by the emulation devices to transmit and/or receive data.

The terms network device and network function may be used interchangeably herein.

Multi-modal data may refer to input data from one or more different kinds of devices and/or sensors. Multi-modal data may refer to the output data to one or more different kinds of destinations (e.g., one or more WTRUs) required for the same task and/or application. Multi-modal data may include more than one Single-modal Data. There may be a strong dependency among one or more (e.g., each) instance of Single-modal Data. Single-modal Data may be seen as one type of data.

A device and/or sensor that generates (e.g., sends) single-modal data may be a WTRU and/or may use a WTRU to send single-modal data to a network. Single-modal data may be sent to applications that are hosted on one or more other WTRUs and/or applications that are hosted on one or more network servers.

A device and/or sensor that receives single-modal data may be a WTRU. The device and/or sensor may use a WTRU to receive single-modal data from a network. Single-modal data may be received from one or more applications that are hosted on one or more other WTRUs and/or applications that are hosted on one or more network servers.

A packet data unit (PDU) Set may include one or more PDUs carrying the payload of one unit of information generated at the application level (e.g., a frame and/or video slice for extended and multimodal reality (XRM) Services), which may be of the same importance requirement at the application layer. One or more (e.g., all) PDUs in a PDU Set may be needed by the application layer to use the corresponding unit of information. In examples, the application layer may recover one or more parts of the information unit, when some PDUs are missing. A multi-modal synchronization threshold may refer to a maximum tolerable temporal separation of the onset of two stimuli, where a first stimuli may be presented to one sense and a second stimuli may be presented to another sense, such that the accompanying sensory objects are perceived as being synchronous. A synchronization threshold may refer to the maximum tolerable temporal separation between the transmission and/or reception of two flows.

With respect to a PDU Set, the unit of information may be an Application Layer unit of information. The terms unit of information and application layer unit of information may be used interchangeably herein.

A WTRU Route Selection Policy (URSP) rule may be a policy that is used by the WTRU to determine how to route outgoing traffic. Traffic may be routed to an established PDU Session, may be offloaded to non-3GPP access outside a PDU Session, may be routed via a ProSe Layer-3 WTRU-to-Network Relay outside a PDU session, and/or may trigger the establishment of another (e.g., new) PDU Session.

One or more (e.g., each) URSP rule may include two or more parts. The first part of the URSP rule may include a Traffic descriptor that is used to determine when the rule is applicable. A URSP rule may be determined to be applicable when every component in the Traffic descriptor matches the corresponding information from the application. The second part of the URSP rule may include a list of Route Selection Descriptors (RSD). The list of RSDs may include one or more RSDs. The RSDs may be listed in priority order and/or may describe the characteristics of a PDU Session that may be used to carry the uplink application data. Characteristics of a PDU Session may include session and service continuity (SSC) Mode, data network name (DNN), and/or single-network slice selection assistance information (S-NS-SAI). Additionally or alternatively, the RSD may include a Non-Seamless Offload indication that indicates that the traffic may be sent via non-3GPP access (e.g., WiFi) and/or outside of a (e.g., any) PDU Session.

A WTRU may evaluate the URSP rules for one or more (e.g., each) detected (e.g., newly detected) application in the order of Rule Precedence and/or may determine if the application matches the Traffic descriptor of one or more (e.g., any) URSP rules. The WTRU may select a Route Selection Descriptor within the applicable URSP rule in the order of the Route Selection Descriptor Precedence, for example, when a URSP rule is determined to be applicable for a given application.

The WTRU may determine if there is an existing PDU Session that matches one or more (e.g., all) components in the selected Route Selection Descriptor, for example, when a valid Route Selection Descriptor is found. The WTRU may associate the application to the existing PDU Session, for example, when a matching PDU Session exists. For example, the WTRU may route the traffic of the detected application on the matched PDU Session. The WTRU may try to establish another (e.g., new) PDU Session using the values specified by the selected Route Selection Descriptor, for example, if none of the existing PDU Sessions matches the RSD.

A Traffic Descriptor may be an Application Descriptor, an internet protocol (IP) descriptor, a Domain Descriptor, a non-IP descriptor, a DNN, and/or connection capabilities. An IP descriptor may be a Destination IP 3 tuple(s) (e.g., a IP address and/or IPv6 network prefix, port number, protocol ID of the protocol above IP, etc.).

A (e.g., typical) WTRU may be involved with one or more (e.g., several) activities during its (e.g., normal) operation. The one or more activities may be divided into one or more (e.g., 5) broad categories: Deep sleep; periodic activities in Idle mode; periodic activities in Connected mode; data transmission and/or reception; and/or control channel monitoring (e.g., while in Connected mode). Control channel monitoring may refer to the activity where the WTRU is not involved in (e.g., any) uplink and/or downlink data transmission, but is monitoring the control channel (e.g., in particular the Physical Downlink Control channel (PDCCH)), to receive Downlink Control Information (DCI) from the RAN node. Examples of the DCI may include downlink (DL) and/or uplink (UL) scheduling information. Power consumption studies may show that a WTRU consumes a significant amount of (e.g., a great deal of) power while control channel monitoring. For example, control channel monitoring may be responsible for about 55% of the WTRU power consumption (e.g., even though it may account for less than 10% of the activities of a WTRU).

To address this power consumption, the network may configure the WTRU in one or more ways. For example, the network may configure connected Mode DRX (CDRX) for a WTRU. When the WTRU stops PDCCH monitoring, for example, CDRX may control to save power. CDRX may have an ON-OFF cycle. The WTRU may monitor the PDCCH during the ON duration(s). The WTRU may stop monitoring the PDCCH during the OFF duration(s). The network may guarantee that the WTRU does not receive a DCI during the WTRU's OFF duration. The ON duration of the cycle, also known as the Active time, may be variable, and/or may be extended based on UL and/or DL activity. For NR, WTRU support for CDRX may be mandatory, but its activation and/or configuration may be controlled by the RAN node through radio resource control (RRC) signaling. Once a RAN node configures CDRX, for example, it may be considered active, and/or the WTRU may follow CDRX for power savings. Additionally or alternatively, the network device may configure (e.g., the power reporting policy may configure) the WTRU for an extended and multimodal reality (XRM) service, for example, using one or more parameters (e.g., one or more parameters associated with a power status of the WTRU).

Extended reality (XR)/media traffic may be associated with high throughput, low latency, and/or a high reliability requirement. A WTRU battery level may impact the user's experience since the high throughput requires the high-power consumption in terminal side. Considering the limited radio resource and/or end-to-end QoS policy control from the system perspective, the 5GS may be enhanced to support trade-off among throughput, latency, reliability, and/or device battery life.

WTRU Configuration at the non-access stratum (NAS), RRC, and/or Physical and Application layer may be adjusted in one or more ways that make one or more tradeoffs between battery life and user experience. For example, changing an application layer codec setting so that video and/or audio is streamed in higher quality may result in a better user experience, and/or may (e.g., also) result in consuming more energy from the battery. A better user experience may include, for example, one or more of: application layer code that may lead to a higher video and/or audio quality, enhanced resolution, and/or enhanced audio quality/clarity; lower latency (e.g., a user may not wait to receive the stream and/or there may be continuity in the stream of the video); higher throughput (e.g., may make it possible to send video and/or audio with a better codec and/or resolution which may be perceived as having a better quality from user perspective; and/or enhanced user experience (e.g., lower latency, higher throughput, higher resolution, etc.).

The WTRU may report information to the 5G Core and/or next generation (NG) RAN about its power status. Reporting information to the 5G Core and/or NG Ran about the power status of the WTRU may include one or more benefits. The 5G Core and/or NG RAN may (e.g., then) take one or more actions to tradeoff between user experience and battery life. For example, the CDRX On time may be increased in order to decrease data latency at the expense of consuming more energy from the battery. 5GS may not support one or more (e.g., any) procedure for the WTRU to report battery, power, and/or status to the 5G Core Network and/or NG RAN. The 5G System may not support one or more (e.g., any procedures) for the 5G Core and/or NG RAN to configure the WTRU to know when to report power status and/or what information to report when reporting power status.

Figure 2:
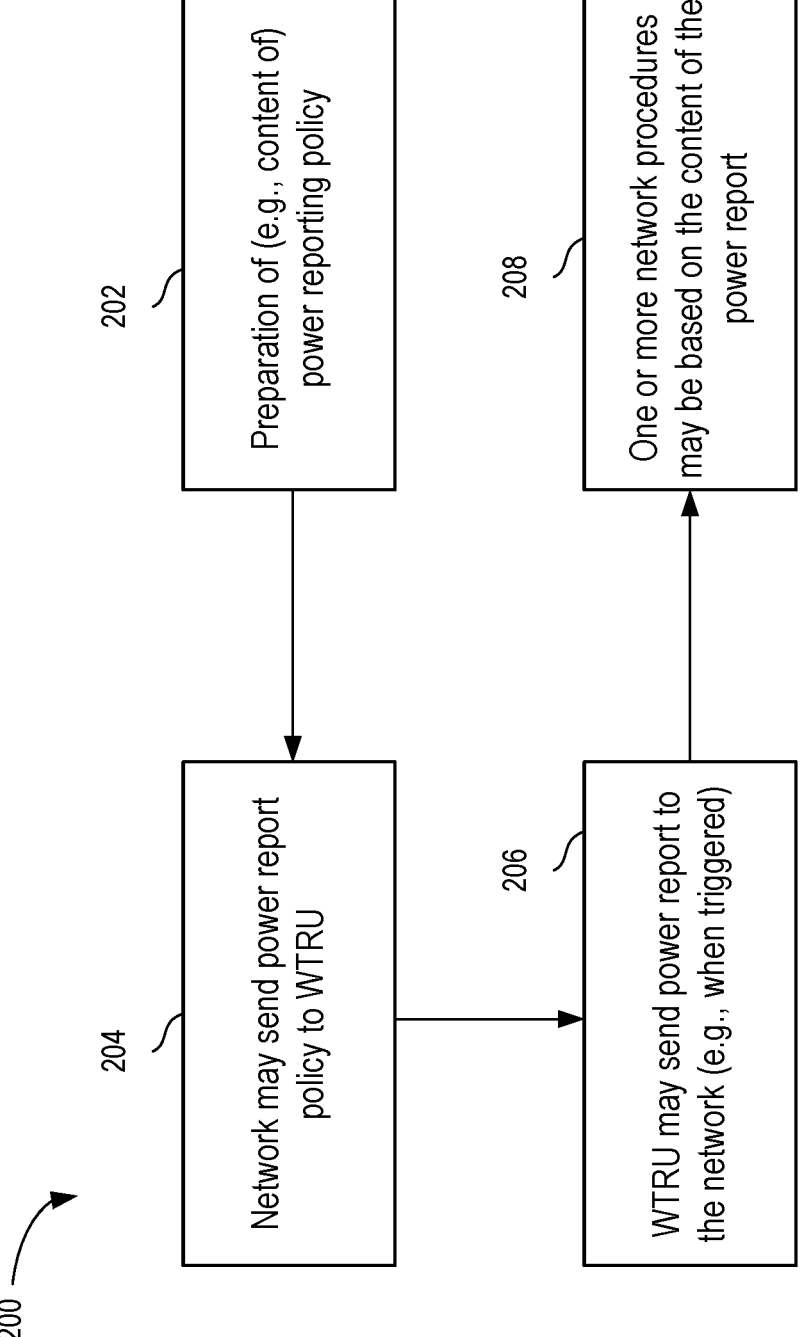
FIG. 2 depicts an example WTRU power reporting procedure.

FIG. 2 depicts an example WTRU power reporting procedure 200. The network may prepare a power reporting policy, and/or may configure the WTRU with a power reporting policy. The WTRU may be triggered to report power status based on the policy, and/or the network may take one or more actions to account for the WTRU's power status.

At 202, the network may prepare (e.g., prepare the content of) a power reporting policy. Information may be included in a power reporting policy. A power reporting policy may include information that is sent from the network (e.g., 5G Core and/or NG radio access network (RAN)) to the WTRU and/or may indicate to the WTRU what event(s) may trigger a Power Report to be sent to the network and/or what information should be included in a Power Report.

At 204, the network may send a power report policy to the WTRU. One or more procedures may be used to send the power reporting policy to the WTRU. One or more events may trigger the network to send the power reporting policy to the WTRU.

At 206, the WTRU may send the power report to the network, for example, when triggered. One or more procedures may be used to send the power report to the network when the WTRU is triggered to send a power report.

At 208, one or more procedures may be triggered in the network based on the content(s) of the power report. For example, the content of the power report may trigger the network to take one or more actions to improve WTRU energy consumption at the expense of user experience. For example, the content of the power report may trigger the network to take one or more actions to degrade user experience in order to decrease WTRU energy consumption and/or prolong the battery life.

The WTRU may receive a power reporting policy from the network (e.g., 5G Core and/or NG RAN). The power reporting policy may provide the WTRU with information regarding power status reporting. For example, the power reporting policy may indicate information regarding power status reporting.

Each Power Reporting Policy may be associated with a Power Reporting Policy identification (ID). The Power Reporting Policy ID may be referenced by one or more other polices and/or rules (e.g., URSP and/or wireless local area network selection policy (WLANSP) Rules) in the WTRU in order to indicate to the WTRU when the Power Reporting Policy may be applied.

The power reporting policy may be at one or more different granularities. The power reporting policy may be per WTRU. In examples, the WTRU may be provided a single policy. Additionally or alternatively, the power reporting policy may be per QoS flow. In examples, the WTRU may have one or more (e.g., multiple) power reporting policies—one or more (e.g., each) policy(ies) may apply to a set of service data flows. Additionally or alternatively, the power reporting policy may be per service data flow (SDF). In examples, the WTRU may have one or more (e.g., multiple) power reporting policies—one or more (e.g., each) policy(ies) may apply to one SDF. The WTRU may combine one or more policies, for example, in cases that a WTRU has one or more (e.g., multiple) reporting policies. For example, if a first policy indicates the WTRU to report power status every 5 minutes and a second policy indicates the WTRU to report power status every 7 minutes, the WTRU may decide to report the power status every 5 minutes to satisfy both policies.

The power reporting policy may indicate to the WTRU what event(s) trigger and/or stop the power monitoring procedure(s).

The power reporting policy may include the time when the WTRU may start power status monitoring. For example, the 5GS may expect the WTRU to have more activity at one or more (e.g., certain) times of the day (e.g., rather than at night). In examples, the 5GS may configure the WTRU to monitor power status starting at 7 am and/or not to monitor power status after midnight. The 5GS may infer one or more times of the day. The 5GS may infer one or more times of the day, for example, when the WTRU is configured to (e.g., needs to) monitor WTRU power status. The 5GS may infer one or more times of the day through WTRU activity information (e.g., data usage during the day), for example. Additionally or alternatively, the 5GS may infer (e.g., expect, predict) that certain time(s) of the day are when the WTRU may (e.g., may need to) report its power status, for example, through information about previous WTRU behavior (e.g., data usage of certain application at a certain time of the day, etc.).

The 5GS may inform the WTRU to stop monitoring WTRU power status under one or more (e.g., certain) conditions. The 5GS may stop monitoring WTRU power status, for example, if the WTRU battery level is (e.g., relatively) above a certain threshold and/or at a certain time of the day. For example, the WTRU may stop may monitoring WTRU power status during one or more time slots (e.g., from midnight to 7 am). The 5GS may inform the WTRU to stop monitoring WTRU power status if the WTRU is plugged in/charging.

The power reporting policy may be described based on service information. The application through the application function (AF) may, for a certain service session, provide one or more (e.g., some) power reporting requirements and/or information. The power reporting requirements and/or information may include whether to activate power reporting when the service session is activated. For example, the network node may receive media codec information from the AF. The media codec information may include one or more QoS value. The AF may (e.g., also) include one or more (e.g., some) threshold values, such as minimum battery and/or power requirement, and/or minimum and/or preferred power mode for the service. The AF may (e.g., also) consider whether the WTRU is plugged into a power source or not. For example, the power requirements and/or information may consider whether the WTRU is plugged into a power source or not. For example, it may not be necessary to monitor power consumption in cases where the WTRU battery level is below a certain threshold and the WTRU is plugged into a power source.

The PCF may use this power reporting service information to generate one or more power reporting policies related to this service. In examples, the power reporting policy may include a traffic descriptor to inform the WTRU that when traffic with this descriptor information is exchanged, the corresponding power reporting policy is activated (e.g., with one or more other reporting policy parameters). This may be beneficial if, for example, there are two service sessions which have different power reporting granularities (e.g., such as reporting frequency, start, and/or stop time). The PCF may generate a power reporting policy for one or more (e.g., each) services (e.g., by means of different traffic descriptors and/or reporting content and/or parameters) and/or may provide the one or more generated policies to the WTRU. The network node may generate the power report policy based on a determination associated with the application. The network node may generate the power report policy based on a battery consumption pattern determined by one or more received power status reports from the WTRU. The network node may generate one or more PCC rules for media traffic flow based on the received media codec information and a trade-off between quality of experience (QoE) and power consumption of the WTRU. The network node may generate one or more PCC rules based on one or more of: a determination of one or more latency values; a determination of one or more of video modality, battery level of the WTRU, XRM modality, and/or video throughput; and/or a determination to align delay tolerant traffic with real time traffic. One reporting policy may indicate to the WTRU to report power level every 5 minutes including available power level, whereas another service may indicate a reporting frequency of 15 minutes with heat status level.

The WTRU may use the one or more generated power reporting policies. The WTRU may be provisioned with one or more of these service-related power reporting policies. The WTRU may use the one or more policies when it detects that data with traffic descriptor matching one of the policies is exchanged with the WTRU, for example. The WTRU may know to stop reporting power information according to the traffic's policy, for example, if the WTRU detects that the traffic is no longer exchanged (e.g., if the corresponding QoS flow for this traffic is removed).

The power reporting policy may indicate to the WTRU where to send the power report. For example, the generated power report policy may configure the WTRU to send the power status report to a network function and/or to an application function.

The power reporting policy may (e.g., also) include which entity(ies) of the network (e.g., 5GS) to send the report to. The power status report may be provided to the PCF for policy control management. The power status report may (e.g., also) be provided to the network data analytic function (NWDAF). The power status report may be provided to the NWDAF for purposes of inference to help better serve the WTRU. For example, the WTRU power report may be used to predict WTRU power consumption behavior for certain time and/or location. The WTRU power report may be used to infer the WTRU's battery consumption pattern (e.g., may be learned from one or more reports previously received from one or more other WTRUs that use and/or used the same application). In such scenarios, the frequency of the one or more reports may be reduced (e.g., reports only used for improved precision) and/or the PCF may ask the WTRU not to send anymore reports (e.g., in turn further optimizing battery consumption). The decision to reduce the frequency of (e.g., and/or eliminate) reporting might be made after receiving one or more (e.g., a certain number of) reports. The reports may be used to identify the battery consumption pattern, for example, from existing battery consumption patterns (e.g., associated with applications, locations, and/or wireless conditions).

The reporting policy may indicate whether the report is to be sent via User plane (UP) and/or the control plane (CP). For the user plane, the WTRU may send the report to the corresponding user plane function (UPF), which may forward it to one or more network functions (NFs) of interest, such as the session management function (SMF), policy control function (PCF), NWDAF, unified data repository (UDR), and/or the like. The network may decide to have reporting using user plane or control plane depending on the report frequency and/or network load.

The power reporting policy may include the type of content related to power status to be included in the report. The type of content may be indicated by one or more of the following power report Information Elements (IEs) in the power reporting policy: device battery characteristics, WTRU battery maximum capacity, battery status, battery level, time left to (e.g., fully) charge; time available for supporting one or more activities; temperature level; battery level indication; device power mode; last time the WTRU was plugged; information regarding WTRU storage and/or memory status and/or central processing unit (CPU) load; information regarding the power consumption of the XRM service; information regarding high power consuming applications; rate of charge of power status and/or battery level; and/or emulated (e.g., desired) power consumption level.

The power reporting policy may include one or more device battery characteristics IE(s). Device battery characteristics may include battery capacity (e.g., in milliampere-hour (mAh)), battery voltage (e.g., in V), and/or battery technology (e.g., lithium polymer (Li-poly)). One or more device battery characteristic information may fixed for a certain device (e.g., it does not change with time); one or more device battery characteristics may be reported in an initial power report and/or may not be included in recurring power reports for the WTRU.

The power reporting policy may include a WTRU battery maximum capacity IE. The WTRU battery maximum capacity may measure the WTRU battery capacity relative to the capacity when WTRU was new. A new WTRU may reference when a customer/user buys a brand-new device with a certain initial battery capacity. The maximum battery capacity may refer to the current battery capacity of the WTRU and/or the ratio of the current battery capacity of the WTRU and the initial battery capacity of the WTRU (e.g., brand new WTRU). Although the battery maximum capacity of the WTRU may change over time, it may rather static (e.g., may change slowly compared to how often the WTRU is used).

The power reporting policy may include a battery status IE. The battery status IE may indicate whether the device is unplugged, plugged, and/or charging. The battery status IE may (e.g., also) indicate if the WTRU is mains powered and/or using fast charging.

The power reporting policy may include a battery level IE. The battery level IE may indicate the percentage and/or the value (e.g., in mAh) of the current WTRU battery level.

The power reporting policy may include a time left to (e.g., fully) charge IE. For example, the time left to fully charge IE may indicate the time it takes the WTRU to be fully charged (e.g., if the WTRU is plugged in).

The power reporting policy may include a time available for supporting one or more certain activities IE. The time available for supporting certain activities IE may indicate one or more (e.g., some) estimated values of how long the WTRU may support one or more certain activities with the current power level. One or more activities may include standby, 5G internet, call, wireless fidelity (Wi-Fi), music, video, and/or global positioning system (GPS). This information may give an approximation for one or more certain activities to be supported by the WTRU. This information may assist (e.g., as an input) the network, for example, to better infer the time available for specific XRM traffic.

The power reporting policy may include a temperature level IE. The temperature level IE may indicate the WTRU current heat level. For example, a high throughput modality may impact WTRU heat level. Indication of the WTRU current heat level may assist the network in helping the WTRU.

The power reporting policy may include a battery level indication IE. The battery level indication IE may include one or more certain battery level thresholds. The battery level indication IE may include one or more certain labels such as: low battery, average battery, and/or high battery level. The one or more labels of battery may be mapped to values of battery (e.g., whether percentage and/or absolute value) related to the battery level thresholds. The network may configure (e.g., if it has some initial information about WTRU power characteristics such as capacity and/or voltage) the WTRU to report (e.g., only report) the one or more indication(s) (e.g., capacity and/or voltage), for example, if the network (e.g., 5GS) wants to have a brief indication of battery level (e.g., rather than the full power status report). The brief indication of battery level may be useful to the network and/or the AF.

The power reporting policy may include a device power mode IE. The device power mode IE may indicate, if available, whether the WTRU is on low power mode (e.g., low power mode is activated in the device) and/or whether power saving mode is activated or not.

The power reporting policy may include a last time the WTRU was plugged IE. The last time the WTRU was plugged IE may indicate a time at which the WTRU was last plugged in.

The power reporting policy may include an IE regarding WTRU storage and/or memory status and/or CPU load. The information regarding WTRU storage and/or memory status and/or CPU load may indicate information regarding the WTRU's memory usage and/or CPU load. For example, the WTRU may provide the amount of random access memory (RAM) memory that is used (e.g., for a certain time and/or duration). The WTRU may provide the network (e.g., 5GS) with a description regarding a WTRU storage level, a WTRU memory level, and/or a WTRU CPU level. For example, the WTRU may indicate that it is in limited storage and/or limited memory status (e.g., to indicate that it does not have a lot of available storage and/or RAM memory available). If the application function associated with the XRM service, may provide different service requirements (e.g., throughput), a set of QoS parameters and so on, that are associated with certain WTRU storage usage and/or certain WTRU memory usage. For example, if the WTRU is in a low memory status at a certain point in time, the network may adjust the QoS parameter(s) for the considered XRM traffic, to decrease the bitrate and/or increase the delay, so that the memory usage may be supported by the WTRU. The AF may request a throughput (e.g., r1) if the WTRU memory and/or storage status is in low memory status, for example. Additionally or alternatively, the AF may request another (e.g., second) value of throughout (e.g., r2) corresponding to when the memory and/or storage of the WTRU is in high memory status, for example. The AF may provide both values of throughput (e.g., r1 and r2) with their corresponding memory and/or storage status conditions.

Similar to the power information, the power reporting policy may include information about the memory usage of the specific XRM service and/or information regarding high memory consuming applications that are running in the WTRU. This information may be useful for the network to better assist the WTRU to run XRM service, for example, by taking memory and/or power consumption into consideration.

The power reporting policy may include an IE regarding the power consumption of the XRM service. The information regarding the power consumption of the XRM service may be provided as a percentage of total power consumption for the WTRU. For example, the WTRU may provide an indication that the XRM service has consumed 10% of the WTRUs power over the last hour and/or the WTRU may provide an indication that the XRM service has consumed 1 mAh over the last hour.

The power reporting policy may include an IE regarding high power consuming applications. The information regarding high power consuming applications may help the network determine if reducing the quality of experience (QoE) for the XRM service results in significant power savings. For example, the WTRU may have an active GPS application that consumes significant power. In such cases, reducing the QoE for the XRM service may not significantly help with battery life. The WTRU may (e.g., also) provide an indication of the type of application that is consuming the power (e.g., GPS, camera, etc.), the number of such applications, and/or whether the one or more applications are using cellular transmissions.

Providing the indication of the type of application that is consuming the power may be done at a finer granularity. For example, the indication may be provided at the level of application sub-routines/sub-functions/procedures. It may be known, and/or it may be inferred that, one or more some components/procedures of the application consume more battery life than other parts. This information may come from a network component (e.g., a NWDAF). This information may be stored by a network function as part of the WTRU/subscriber/application profile (e.g., unified data management function (UDM)/UDR). This information may be provided externally by an application service provider to a network function, and/or by an application client at the WTRU to a network node. For example, turning on augmented reality (AR) functionality in an application may significantly increase CPU usage, and as a result, battery consumption may also increase. Energy consumption may be (e.g., further) optimized when AR functionality is turned on.

The power reporting policy may include an IE regarding the rate of change of power status and/or the battery level. The network may use the rate of change of power status and/or battery level to determine the amount of QoE reduction (e.g., reduction needed) to counter the low battery level. The network may decide to use one or more QoS parameters that provide the greatest power savings, for example, if the rate of change of power status is high; this may result in a marked change in the QoE. Conversely, the network may decide to change one or more QoS parameters so that there is a more gradual change in QoE, for example, if the rate of change of power status is slow.

The power reporting policy may include an IE regarding emulated (e.g., and/or desired) power consumption level. The WTRU may use the emulated and/or desired power consumption level to request policy associated to a given power status and/or battery level. For example, even if the WTRU power status is high, based on user choice the WTRU may request "low power" policy to be applied (e.g., including QoS profile, one or more QoS rules, etc.). For example, a user may choose to put the WTRU in a low battery mode (e.g., using settings on the WTRU) when the power status of the WTRU is high (e.g., there is enough battery and/or a high battery level). A user may opt to disable low battery mode when the power status of the WTRU is low (e.g., there is not enough battery and/or a low battery level). For example, if the user is watching a video and the battery status is low, the user of the WTRU may disable the low power/low battery mode in the WTRU setting(s). There could be one or more other emulated versions of other power report IE. For security, the WTRU may limit the values that can be set for the one or more emulated IEs (e.g., only to a worst value), to avoid cases where a malicious application may drain an already depleted battery. A user may request a lower level of service to save energy.

The report content may include one or more (e.g., some) of the IEs described herein, for example, based on the time of the report (e.g., if it is a first-time reporting and/or recurrent), and/or based on the service requirement(s) of the XRM service.

The power reporting policy may indicate to the WTRU what event(s) trigger the WTRU to send the power report. For example, the power reporting policy may indicate a plurality of (e.g., one or more) triggers associated with the power report.

The power reporting policy may include what type of triggers are considered for sending the power status report. An example trigger may be the battery level of the WTRU. The network (e.g., 5GS) may indicate to the WTRU to report power status when the battery is below a certain threshold. For example, the network may indicate that power level monitoring becomes crucial if the battery level is under a certain level (e.g., a trigger for the WTRU to send the power status report may be based on a determination that the battery of the WTRU is below a predetermined threshold); the network may indicate to the WTRU to start reporting (e.g., with a certain frequency), the power report. The network and/or AF may not require the WTRU to send it a power status report, for example, if the WTRU battery level is above the predetermined threshold.

Another trigger to send the power report may be whether the device is plugged (e.g., and/or charging) or unplugged (e.g., and/or not charging). The reporting policy may indicate that WTRU sends a power report if (e.g., only if) the device is unplugged and/or may indicate that the WTRU is not required to send a power report if the WTRU is charging.

Another trigger to send the power report may be based on when the WTRU is to start sending the power status reporting. The power reporting policy may include a time (e.g., a time of day) when the WTRU may start power status reporting. For example, the network (e.g., 5GS) may expect the WTRU to have more activity (e.g., at certain time(s) of the day rather than at night). For example, the network (e.g., the 5GS) may configure the WTRU to report power information starting at a predetermined time in the morning (e.g., 7 am) and/or not to report power information after a predetermined time at night (e.g., midnight). The network (e.g., 5GS) may infer the one or more times of the day when the WTRU needs to report power information, through the WTRU activity information (e.g., data usage during the day) for example. The WTRU may (e.g., also) start power reporting after a certain time x has passed after a certain application has started. For example, a certain application may be started at time t, and the WTRU may start power reporting at time t+x.

One or more triggers may be associated with when the WTRU is to stop sending the power status reporting. The network (e.g., 5GS) may inform the WTRU to stop reporting power information under one or more certain conditions. For example, the network may inform the WTRU to stop reporting power information (e.g., stop sending the power status report) based on one or more of: a detection of a change of power status; a determination that the WTRU is plugged in and/or is charging; a determination that the battery level of the WTRU is at and/or above a certain threshold, and/or when the time is within a certain range of time of day (e.g., a time of day). The WTRU may stop sending the power status reporting based on one or more IEs, as described herein. The network (e.g., 5GS) may infer the WTRU's battery consumption pattern. For example, the network (e.g., 5GS) may infer the WTRU's battery consumption pattern based on learning from one or more reports previously received from one or more other WTRUs that used the same application(s), and/or may ask the WTRU not to send anymore reports (e.g., in turn further optimizing battery consumption).

Another trigger to send the power report may be based on power status report frequency. The WTRU may determine how often to send the power status report. One or more triggers may be associated with how often the WTRU is to send the power status report. The power reporting policy may include a power status reporting frequency (e.g., information about how often to report power status). The power status reporting frequency may vary depending on the application that triggered the power reporting. For example, when the service includes a video modality, where the power status may be important (e.g., since there might be a change that the power level will change when exchanging this video traffic), the power status reporting frequency may have a higher frequency (e.g., every 5 mins). When the service includes a modality where, for example, the power consumption might vary slowly with time and/or traffic exchange (e.g., haptic), the power status reporting frequency may have a lower frequency (e.g., every 15 mins).

The power status reporting frequency may be linked to one or more characteristics of the traffic itself. For example, the network (e.g., 5GS) may indicate to the WTRU that, for a video modality, the WTRU may report power information at the end of a video burst. For example, the WTRU may report power information after one or more (e.g., 10) bursts of videos have been sent (e.g., over Uplink). The WTRU may keep track of how many video bursts have been exchanged, for example, if the WTRU detects when the modality burst starts and/or ends. The WTRU may determine it is time to report power information (e.g., according to the video modality reporting policy), for example, when the 10th burst has been exchanged. The WTRU may be configured to report power status after one or more (e.g., every 10) bursts of video have been received from the network. For example, the WTRU may report power status after the 10th burst, the 20th burst, the 30th burst, etc.. This granularity of reporting related to bursts and/or PDU Sets of a certain modality of XRM traffic, may be achieved through one or more traffic characteristics detection mechanisms at the WTRU and/or at the network (e.g., 5GS), and/or through information provided to the WTRU about one or more XRM traffic patterns.

The network (e.g., 5GS) may infer the WTRU's battery consumption pattern. For example, the network (e.g., 5GS) may infer the WTRU's battery consumption pattern based on (e.g., learned from) one or more reports previously received from one or more other WTRUs that used the same application. The network may reduce the frequency of the reports (e.g., reports may be used for improved precision).

Another trigger to send the power report may be based on and/or associated with the temperature level of the WTRU. The network (e.g., 5GS) may indicate that the WTRU sends a power status report when the WTRU temperature becomes high (e.g., exceeds a predetermined threshold).

The power reporting policy may include WTRU location information. This may indicate to the WTRU that this reporting policy is to be applied when the WTRU is in one or more certain locations, and/or (e.g., perhaps) not in other locations. For example, if the WTRU is in the office and/or the user is at home, the network might not require reporting its power status when using a certain application. The network might not require the WTRU to report its power status, for example, since the WTRU might be quickly put in charge (e.g., if needed), if the WTRU is in the office and/or the user is at home. Location information for power reporting may have one or more other considerations (e.g., aside from charging availability). For example, the application may provide one or more power reporting requirements that are related to specific geographical zones and/or not related to one or more other geographical zones.

Another trigger for sending power status report may include one or more parameters related to the bitrate and/or maximum bitrate the WTRU has, such as WTRU-aggregate maximum bit rate (AMBR). The network may configure the WTRU to start sending the power status report when the WTRU-AMBR is of a certain value. For example, the network may configure the WTRU to start sending the power status report when the WTRU-AMBR is greater than a predefined threshold.

Another trigger for sending a power status report may include the WTRU battery status/level crossing one or more thresholds. The power reporting policy may include the value of the one or more thresholds.

Another trigger for sending a power status report may include a change in power status (e.g., from battery to mains). The power reporting policy may include an indication to provide a power status report based on the change in power status.

Another trigger for sending a power status report may include a start and/or stop of an application. For example, a trigger for sending the power status report may be associated with the start of a (e.g., high-power consumption) application. For example, a trigger for sending the power status report may be associated with the sop of a (e.g., high-power consumption) application. The WTRU may report the power status report when a high-power consumption application (e.g., such as an application that uses GPS) is started and/or stopped. The power reporting policy may include an indication to provide a report based on the start/stop of one or more high-power consumption applications. The policy may (e.g., also) provide an indication of the one or more specific applications for which this applies and/or type of application(s) for which this applies.

Another trigger to send the power status report may be based on content. When to send the power status report may be content specific (e.g., service data flow specific, application specific, PDU session specific, etc.) For one or more types of (e.g., some) content one or more power status reports may be repeated periodically (e.g., battery level sent every 5 mins). For one or more other types of content, one power status report may (e.g., only) be sent one time (e.g., initially, when an application starts, when an application ends, etc.). For one or more (e.g., other) content, one or more power status reports may be sent aperiodically, for example, based on one or more (e.g., some) trigger conditions.

In examples, the WTRU may modify on its own one or more (e.g., some) parameters (e.g., the brightness of the display, the processing of some signals coming from sensors, and/or the like) to meet a battery life constraint. In this case, the network may take advantage of knowing these one or more actions performed by the WTRU. For example, the network may request the WTRU to report such change(s) in the power report. The network may configure the WTRU to report the one or more events described herein. Additionally or alternatively, the WTRU may provide a status of a certain metric, such as rate of change power level (e.g., as described herein), that the WTRU may be able to determine based on one or more parameters including change of display brightness and/or the like. The WTRU may report the status of that certain metric (e.g., the power change rate) to the network, for example without the network having to know one or more (e.g., all of) the changes that the WTRU performed (e.g., performed locally).

A power reporting policy may combine one or more of the triggers described herein, for example, for when the WTRU sends and/or stops sending the power status report.

The power reporting policy may indicate to the WTRU one or more certain actions that may be taken based on the content of the power report and/or based on one or more detected conditions and/or one or more triggers associated with sending the power status report).

The network (e.g., 5GS) may (e.g., also) include one or more certain actions for the WTRU to perform under one or more certain conditions related to the power status. As described herein, the network (e.g., 5GS) may configure the WTRU to send a power status report under one or more certain triggers. The reporting policy may (e.g., also) indicate to WTRU to perform one or more other actions such as activating low power mode (e.g., throttle an application). The WTRU may be configured to perform one or more certain actions, for example, by selecting one or more URSP rules based on power report IEs.

Embodiments are described herein for one or more procedures for provisioning one or more power reporting policies in the WTRU and/or how the WTRU may behave based on the one or more policies. A network may provide one or more power reporting policies to a WTRU. The one or more power reporting policies may indicate one or more behaviors associated with the one or more reporting policies. Sending a power reporting policy to a WTRU may be a network-initiated procedure. For example, a network function, such as a PCF, may trigger a procedure to send a power reporting policy the WTRU based on a request from the AF. The request from the AF may be triggered (e.g., may be triggered by an AF), when an application on the WTRU joins an XRM session.(e.g., by receiving XR related data traffic from the WTRU and/or through application layer signaling). Additionally or alternatively, the PCF may trigger the procedure when the WTRU establishes a PDU Session to a certain DNN/S-NSSAI combination and/or upon receiving a notification that the WTRU is running a certain application (e.g., by service provisioning request from the AF).

Sending a power reporting policy to a WTRU may be a WTRU-initiated procedure. For example, a WTRU may trigger a procedure that involves the network sending a power reporting policy to the WTRU. The WTRU may send a request to the network for (e.g., to receive) the power reporting policy. The request from the WTRU may be triggered by detected application activity (e.g., a request from an Application to the mobile terminal (MT) part of the WTRU via an attention (AT) command). Additionally or alternatively, the WTRU may trigger the procedure when the WTRU establishes a PDU Session to a certain DNN/S-NSSAI combination and/or upon receiving a notification that the WTRU is running a certain application. For example, a URSP Rule may indicate that when a certain Traffic Descriptor matches and/or when a certain RSD is used, a power reporting policy may be needed, may be requested, and/or may be enabled.

A network function (e.g., the PCF) may receive a (e.g., first) message. The network function may receive the message from an AF. The (e.g., first) message may identify (e.g., indicate) a WTRU and/or one or more parameters that may be used by the PCF to configure the WTRU (e.g., for an XRM service). For example, the (e.g., first) message may include an identifier of the WTRU. The (e.g., first) message may include one or more (e.g., multiple) sets of parameters. The one or more (e.g., each) parameter sets may be related to a power status of the WTRU. For example, each parameter set may be related to a power status of the WTRU. The power status of the WTRU may be used to determine which set of parameters to use to configure the WTRU (e.g., which set of parameters may be used to configure the WTRU may be based on the power status of the WTRU). The first message may (e.g., also) indicate to the PCF that the AF wants to subscribe to the PCF. For example, the AF may subscribe to the PCF to be notified when the PCF detects that the WTRU's power status has changed. The first message may (e.g., also) include information about when the WTRU may be configured to report power status information. For example, the first message may indicate how often the WTRU may send the power status report(s) and/or what event(s) may trigger the WTRU to send power status report(s).

The PCF may generate a power reporting policy. For example, based on the content of the (e.g., first) message, the PCF may generate a power reporting policy. The generated power reporting policy may include one or more triggers associated with sending a power status report. For example, the WTRU may determine that a trigger of the one or more triggers associated with sending the power status report has been satisfied. The PCF may send the power reporting policy to the WTRU (e.g., in a NAS Message). The PCF may determine to send the power reporting policy to the WTRU, for example, when the power reporting policy is created and/or based on a request received from the WTRU. Additionally or alternatively, the PCF may determine to send the power reporting policy to the WTRU based on a request that is received in a NAS message from the WTRU.

The PCF may receive a power report (e.g., power status report) from the WTRU. The power report (e.g., power status report) may be received from the WTRU in a NAS message and/or from the AF. The network device (e.g., PCF) may receive the power status report from the WTRU in accordance with the power reporting policy. The WTRU may send the power status report to the network node (e.g., PCF) in accordance with the power reporting policy. The power status report may include one or more battery characteristics associated with the WTRU. The power status report may include power status information associated with the WTRU and/or an indication that indicates the determined trigger to send the power status report.

Based on the power report (e.g., power status report), the PCF may send an indication that a set (e.g., a new set) of one or more PCC rules should be applied (e.g., the report may have indicated that the WTRU is plugged in and/or the content can be sent to the WTRU in a higher quality encoding).

Based on the power report (e.g., power status report), the PCF may send a power status indication to the SMF. The SMF may forward the power status indication to the RAN (e.g., via N2 messaging), for example, based on the power status report. The RAN may adjust one or more WTRU parameters based on the power status indication (e.g., to better account for the WTRU's power status). For example, the RAN may change one or more CDRX parameters based on the power status indication (e.g., so that the WTRU uses a larger CDRX active time when the WTRU is plugged in).

The PCF may update one or more PCC rules based on the power status report. The network node (e.g., PCF) may generate a first set of PCC rules. For example, the network node (e.g., PCF) may generate the first set of PCC rules based one or more of: one or more extended and multimodal reality (XRM) service requirements, one or more quality of service (QoS) requirements (e.g., QoS requirement(s) for XRM traffic, and/or power status information (e.g., as described herein) of the WTRU. The network node (e.g., PCF) may send the first set of PCC rules to a session management function (SMF) to generate a first set of one or more QoS rules to be sent to the WTRU. The network node (e.g., PCF) may send a second set of PCC rules to the SMF to generate a second set of one or more QoS rules to be sent to the WTRU. The WTRU may receive one or more QoS rules from a SMF. The PCF 610 may send the updated PCC rules to the same SMF or to a different SMF, for example, based on the XRM traffic, traffic description information, QoS parameters, and/or the PDU session that carries this traffic. For example, the network node (e.g., PCF) may generate the second set of PCC rules based on the power status of the WTRU, based on one or more XRM requirements, and/or based on one or more QoS requirements (e.g., associated with XRM traffic). The network node may generate one or more PCC rules based on one or more of: a determination of one or more latency values; a determination of one or more of video modality, battery level of the WTRU, XRM modality, and/or video throughput; and/or a determination to align delay tolerant traffic with real time traffic.

The PCF may send a report to an AF. The PCF may send (e.g., based on the power status report), a report to the AF, for example, when the PDC receives a report from the WTRU (e.g., receipt of the power report from the WTRU may trigger the PCF to send a report to an AF). The network device (e.g., PCF), may send one or more updated rules to a user plane function (UPF) to update a protocol unit session associated with the WTRU, for example, based on the power status report. The report (e.g., power status report) may trigger the PCF to send one or more updated N4 rules to the UPF for the WTRU's PDU Session.

Figure 3:
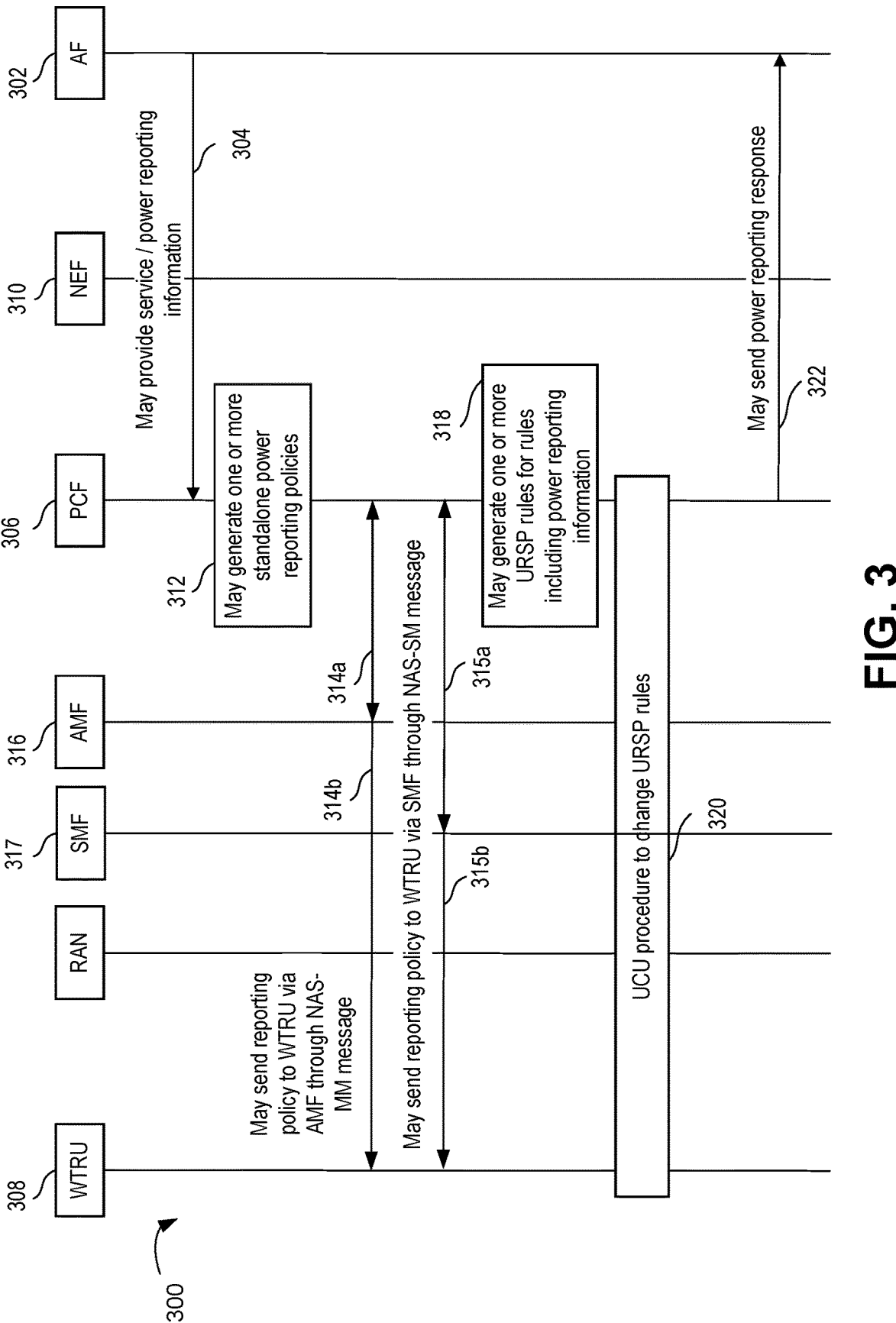
FIG. 3 illustrates an example network-initiated procedure for sending a power reporting policy to the WTRU.

FIG. 3 illustrates an example network-initiated procedure 300 for sending a power reporting policy to the WTRU.

At 304, an AF 302 may invoke a network exposure function (NEF) 310 application programming interface (API), for example, to provide service information for the XRM service. For example the AF 302 may send a message to a PCF 306 (e.g., via a NEF 310) that indicates service and/or power reporting information. The service information may include one or more of: one or more traffic descriptors, one or more QoS requirements, one or more QoS parameters associated with one or more (e.g., different) modalities of the XRM service, WTRU Identifier, power status information associated with the WTRU, and/or the like. For example, the AF may send the network node (e.g., PCF) media codec information. The media codec information may include one or more QoS values.

The AF 302 may be triggered to send the service and/or power reporting information when the WTRU 308 joins the XRM service. The message 304 may include one or more (e.g., multiple) sets of parameters. Each set of parameters may apply to a different power status. For example, one set of parameters may apply when the WTRU 308 is battery powered and the amount of energy that is stored in the battery is relatively low. Another set of parameters may apply when the WTRU 308 is battery powered and the amount of energy that is stored in the battery is relatively high. Another set of parameters may apply when the WTRU 308 is mains powered. The parameters in each set (e.g., delay values) may be used to derive different sets of PCC Rules.

The AF 302 may indicate that WTRUs (e.g., target WTRUs) should be in a medium to high battery level for the XRM service. The AF 302 may (e.g., also) indicate a threshold of power level and/or battery level for the involved WTRU 308, to initiate the XRM service. For example, the AF 302 may require the WTRU (e.g., the target WTRU) to be greater than and/or equal to 20% battery level (e.g., and/or above a certain value in watts (W) and/or mAh) for the service to be initiated. If the battery level of the WTRU 308, at the time of the AF request, is below 20%, the network (e.g., 5GS) may reject the AF request, implying that the WTRU 308 cannot sustainably afford to be in this service, in terms of power consumption.

The AF 302, if authorized, may subscribe to power status information regarding the WTRU 308 for the XRM service, and/or be notified, for example, when the WTRU battery level fits the AF power requirement (e.g., such as 20%). This battery level indication by the AF 302 may be a preference rather than a (e.g., strict) requirement.

The AF request (e.g., at 304) may include preference in terms of the WTRU 308 being plugged or unplugged. The AF may request and/or provide a preference for the WTRU being plugged or unplugged. For example, the AF 302 may indicate a preference for the WTRU 308 to be plugged in when it is using the video modality and/or may indicate no preference when the WTRU 308 exchanges the haptic modality. Additionally or alternatively, the AF may subscribe to change in plugged/unplugged status of the WTRU.

The AF request (e.g., at 304) may indicate that it requires the network (e.g., 5GS) to provision a target WTRU with a power report policy, and/or may include information such as how frequent the reporting is preferred. For example, for a video modality, the suggested reporting frequency may be 5 minutes, whereas for a haptic flow, the power reporting frequency may be 15 minutes. The AF 302 may (e.g., also) link the power reporting frequency to the one or more traffic characteristics, for example, by indicating reporting needed for video modality after a predetermined number of video bursts (e.g., after 20 video bursts) have been exchanged with the WTRU. The request from the AF may require a certain power report policy from the 5GS. The AF request may correspond to subscription to the PCF. The AF request may correspond to subscription information (e.g., if the AF subscribes to one or more events and/or event changes for the WTRU to the PCF).

The AF 302 may indicate one or more events that trigger the WTRU 308 to report power status information. For example, the one or more events may include WTRU location information where power reporting is included.

The AF 302 may provide an indication if the XRM service allows the network (e.g., 5GS) to trade-off QoE to save on power consumption. If so, the AF 302 may provide one or more different service requirements with different power/battery status information and/or one or more QoS parameters with different power/battery status information. For example, power and/or battery level may be separated into five (5) different ranges; the AF may provide 5 different set of QoS parameters. Each set of QoS parameters may correspond with a respective one of the power ranges/modes. Each set of QoS parameters may result in a different QoE.

In examples, instead of a battery and/or power level requirement, the AF may provide a certain budget. The certain budget may include a power budget requirement for a certain service, for example, to manage the WTRU 308 power consumption more efficiently. For example, if the AF 302 is requesting an XRM session for a certain time and/or duration, the AF 302 may include a WTRU power budget. The WTRU power budget may indicate an upper limit to the amount of power for the WTRU 308 to consume during this time and/or duration. This may be aligned with one or more other (e.g., new) time dependent QoS aspects, as well as with requesting future sessions using Background Data Transfer (BDT) aspects.

The NEF 310 may forward the AF request including the power reporting information to the PCF 306.

At 312, the PCF 306 may generate one or more standalone power reporting policies. For example, the PCF may generate one or more PCC rules for media traffic flow based on the received media codec information and a trade-off between QoE and power consumption of the WTRU. The network node may generate one or more PCC rules based on one or more of: a determination of one or more latency values; a determination of one or more of video modality, battery level of the WTRU, XRM modality, and/or video throughput; and/or a determination to align delay tolerant traffic with real time traffic. The PCF 306 that received the message at 304 may be the PCF 306 that serves the PDU Session that the WTRU 308 uses for the XRM Session. The PCF 306 that serves the PDU Session may forward the information to the PCF 306 that serves the WTRU 308 for Access and Mobility Policies and/or the PCF 306 that serves the WTRU 308 for Access and Mobility Policies may generate the Power Reporting Policy and/or send the Power Reporting Policy to the WTRU 308.

The PCF 306 may generate one or more PCC rules and/or power reporting policies using service information provided by the AF 302. For example, the PCF 306 may use the service information provided by the AF 302 to generate the one or more PCC rules and/or the one or more power reporting policies. Additionally or alternatively, one PCF may generate the one or more PCC rules while a second PCF generates the power reporting policy. The PCF 306 may (e.g., also) use information it has about the WTRU 308, provided by UDM, NWDAF, AMF 316, and/or the WTRU 308 itself) to generate one or more (e.g., appropriate) power reporting policies for the WTRU 308.

Having a second PCF generate the power reporting policy (e.g., the PCF that serves the WTRU 308 for Access and Mobility policies) may enable the second PCF to receive information from the PCF that serves each of the WTRU's PDU Sessions and/or use the information from one or more (e.g., multiple) PDU Sessions to form a single power reporting policy. The details of the power reporting policy are described herein.

If at 304 the PCF 306 received one or more different services requirements and/or QoS parameters, corresponding to different power and/or battery status ranges, the PCF 306 may generate a PCC rule for each power level value and/or range. This set of service requirements (e.g., PCC rules) may be indexed. The indexed PCC rules and/or service requirement(s) may be used later, for example, by the PCF 306 to signal to the SMF 317 if there should be a change in which PCC rule applies due to battery and/or power status change. This may be signaled by the PCF 306 sending the index of the PCC rules and/or service requirement(s) to the SMF 317.

In some examples, the PCF 306 may send PCC rules to the SMF 317, for example at 315a. For example, the PCF 306 may send the PCC rules (e.g., based on the XRM traffic description) to the SMF 317 that serves the PDU Session. The PCC Rules may be sent to the SMF 317 by the PCF that serves the PDU Session.

The SMF 317 may use the PCC Rules to generate one or more QoS Rules and send the QoS Rules to the WTRU 308. The SMF 317 may generate and/or send one or more (e.g., multiple) sets of QoS Rules to the WTRU 308. Each QoS Rule may be associated with a power status (e.g., low, medium, high, and/or mains powered). The WTRU 308 may determine to change the one or more applied QoS Rules when it determines that its power status has changed. The WTRU 308 may send an indication to the network when it determines to change which QoS Rule is applied. The WTRU 308 may provide an API to one or more applications, for example, to select one of these rule sets. The API may enable setting one or more values of one or more (e.g., some) power report IEs (e.g., emulated power status). For example, a user may choose to run an application in low power mode, to save batteries during a long trip. In examples, the user may select lower power mode in the WTRU settings, which may trigger the selection of one or more low power QoS rules for one or more (e.g., all) applications. The WTRU 308 may prevent user/applications from selecting a higher target power status than the current power status.

The SMF 317 may use the one or more PCC Rules to generate one or more QoS Profiles and/or may send the QoS Profile(s) to the NG-RAN. The SMF 317 may generate and/or send one or more (e.g., multiple) sets of QoS Profiles to the NG-RAN. Each QoS Profile may be associated with a power status (e.g., low, medium, high, and mains powered). The NG-RAN may determine to change the applied QoS profile, for example, when the NG-RAN determines that the power status of the WTRU 308 has changed. The NG-RAN may make this determination when it receives an indication that the WTRU's power status has changed.

The PCF 306 may send the power reporting policy to the WTRU 308. The WTRU may receive the power reporting policy from a network node (e.g., the PCF 306). If the power reporting policy is generated by the PCF that serves the PDU Session, for example, the policy may be sent to the WTRU 308 via the SMF 317 and/or the AMF 316 and/or NAS-session management (SM) messaging. For example, at 315a, the power reporting policy may be sent from the PCF 306 to the SMF 317. At 315b, the SMF 317 may send the power reporting policy to the WTRU 308 (e.g., via a NAS-session management (SM) (NAS-SM) message),If the power reporting policy is generated by the PCF that serves the WTRU 308 for Access and Mobility, for example, then the policy may be sent to the WTRU 308 via the AMF 316 and/or NAS-mobility management (MM) messaging. For example, at 314a, the PCF 306 may send the power reporting policy to the AMF 316. At 314b, the AMF 316 may send the power reporting policy to the WTRU 308 via a NAS-MM message.

At 318, the PCF 306 may send the WTRU 308 power reporting policy information as part of URSP Rules and/or alongside a URSP Rule. Alongside a URSP Rule may mean that the PCF 306 sends the WTRU 308 power reporting policy that includes an identifier that indicates a URSP Rule and/or an RSD of a URSP Rule. The WTRU 308 may apply the power reporting policy when traffic matches the URSP Rule and/or RSD. If at 304 the AF 302 provides one or more traffic descriptors associated with one or more power reporting requirements, for example, the power reporting policy may be included as part of a URSP rule which has that traffic descriptor as information. In this case, the WTRU power reporting policy may be included as part of the Route Selection Descriptor(s) and/or RSD(s).

The PCF 306 may include in the RSD information about whether power reporting is to be activated if the WTRU 308 starts exchanging traffic matching the traffic descriptor of the URSP rule in question.

If the AF 302 provided the WTRU location information where battery reporting is required, the PCF 306 may include in the RSD of the URSP rule the provided WTRU location information, for example, as validation criteria. The WTRU 308 may report power information if (e.g., only if) the WTRU's location matches the location in the RSD.

The PCF 306 may include start and/or stop time (e.g., a time window), for example, when the power reporting is required. The time window may be included in the validation criteria of the URSP rule. The WTRU 308 may report the power status to the network (e.g., 5GS) during (e.g., only during) the time window provided by the power reporting policy in the URSP rule.

The PCF 306 may (e.g., also) include other power reporting information in the one or more URSP rules (e.g., as described herein).

At 320, after the PCF 306 has generated the URSP rules that include one or more power reporting policies, the PCF 306 may initiate a WTRU Configuration Update (UCU) procedure with the WTRU 308. The WTRU UCU may be used to provide and/or update the WTRU 308 with the one or more updated/provided (e.g., new) URSP rules for the XRM traffic.

At 322, the PCF 306 may inform the AF 302 of the successful WTRU power reporting policy provisioning at the WTRU 308.

A WTRU may receive a message (e.g., a NAS message) with a power reporting policy from a PCF. The power reporting policy may indicate to the WTRU which events trigger and/or stop the power monitoring procedures. The power reporting policy may indicate to the WTRU where to send the power report. The power reporting policy may include a type of content related to a power status to be included in the power report. The power reporting policy may indicate to the WTRU which events trigger the WTRU to send the power report. The power reporting policy may indicate to the WTRU certain actions that should be taken based on the content of the power report and/or detected conditions.

The WTRU may determine to send the power report (e.g., power status report) based on one or more of the following. For example, the WTRU may be triggered to send the power report by detection of a type of traffic and/or detection of a change of power status (e.g., battery level, a plug-in event, or an unplug event). The WTRU may send the power status report based on one or more of: a battery level of the WTRU, an unplugged status of the WTRU, a temperature level of the WTRU, a time of day, a bitrate parameter, a start of an application, a stop of the application, the power status information associated with the WTRU, and/or a detection of a type of traffic.

The WTRU may send the power report to a location that is indicated in the power reporting policy. When the location is a NF, the power report may be sent via NAS signaling. When the location is an AF, the power report may be sent via Application Layer signaling.

The power report may include power status information (e.g., one or more battery characteristics, a battery capacity, a battery level, a time left to fully charge, a temperature level, and/or a power mode) and/or a report cause code that indicates which event triggered the WTRU to send the report.

Figure 4:
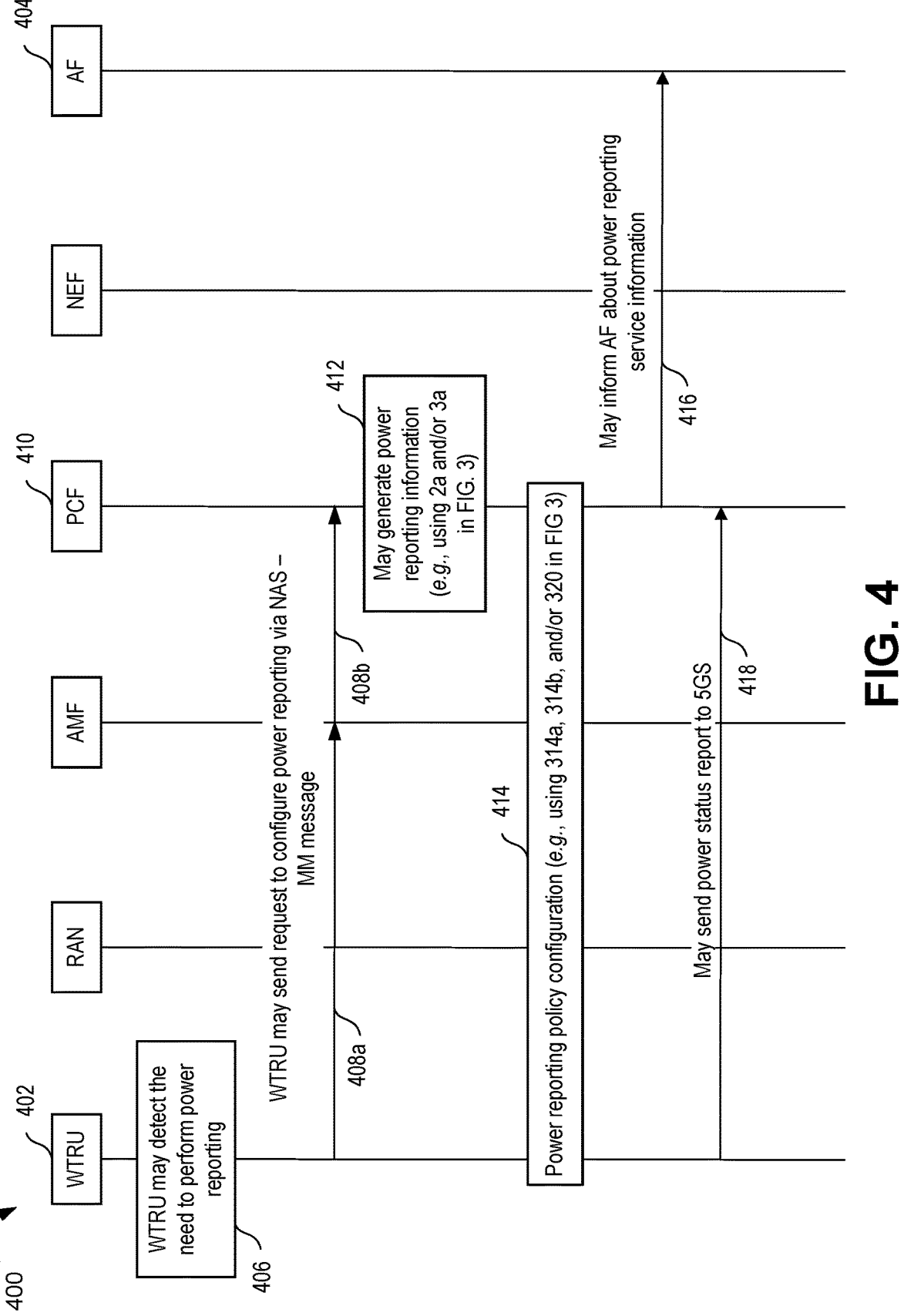
FIG. 4 illustrates an example WTRU-initiated procedure for sending a power reporting policy to a WTRU.

FIG. 4 illustrates an example WTRU-initiated procedure 400 for sending a power reporting policy to a WTRU 402. In the example WTRU-initiated procedure 400, the network may configure a power reporting policy at the request of a WTRU 402 (e.g., instead of the AF 404).

At 406, the WTRU 402 may initiate a request to the network to configure one or more power reporting policies at the WTRU 402. The WTRU 402 may request the network to configure it with an initial power reporting policy. The initial power reporting policy may be a basic and/or generic power reporting policy.

The WTRU 402 may determine, while exchanging some user plane traffic, to report its power status information to the network (e.g., and/or determine that the WTRU 402 may need to be monitored by the network for power status). For example, the WTRU 402 may determine to report power status information if the application itself is not providing information about power status requirement and/or power reporting, and the WTRU 402 wants to provide some pre-configured power reporting policy, to be activated when certain type of traffic is used. For example, the WTRU may want the 5GS to take one or more pre-configured power reporting policy(ies) from the WTRU and/or configure the WTRU with a power reporting policy, and/or may activate the configured power reporting policy. For example, if the XRM application is using a specific network slice, the WTRU 402 may want to be configured with a power reporting policy, even though the application itself may not have provided such power reporting information.

At 408a, the WTRU 402 may send a request to the network (e.g., 5GS), via NAS signaling, e.g., NAS-MM message to the AMF, which then forwards it (e.g., at 408b) to the PCF 410 to indicate a request to be configured for power reporting. The network node may receive the power reporting policy via a NAS-MM message.

At 412, the PCF 410 may receive the WTRU-initiated power reporting policy configuration request. The PCF 410 may generate one or more power reporting policies for the WTRU 402. The PCF 410 may use information available at UDM, NWDAF, and/or AMF, and/or information provided by the WTRU 402 to generate the power reporting information.

At 414, when the power reporting policies are generated, the PCF 410 may provide the WTRU 402 with the generated one or more power reporting policies.

At 416, the PCF 410 may inform the AF 404, by invoking an NEF API, that a WTRU reporting policy has been configured. The PCF 410 may provide related reporting information to the AF 404.

At 418, the WTRU 402 may begin reporting its power status to the network, according to the policy provided by the PCF. For example, the WTRU may send a power status report to the network (e.g., 5GS). The WTRU may send the power status report to the network in accordance with the power reporting policy. The power status report may include power status information associated with the WTRU and/or an indication that indicates the determined trigger to send the power status report. The WTRU may send, to the network node, one or more of: a battery level of the WTRU, a capacity of the battery level of the WTRU, one or more characteristics of the battery of the WTRU, an indication of a time left to fully charge the battery of the WTRU, a temperature level of the battery of the WTRU, and/or a power mode of the WTRU.

Embodiments are described herein for one or more transmission options for power status from a WTRU.

Figure 5:
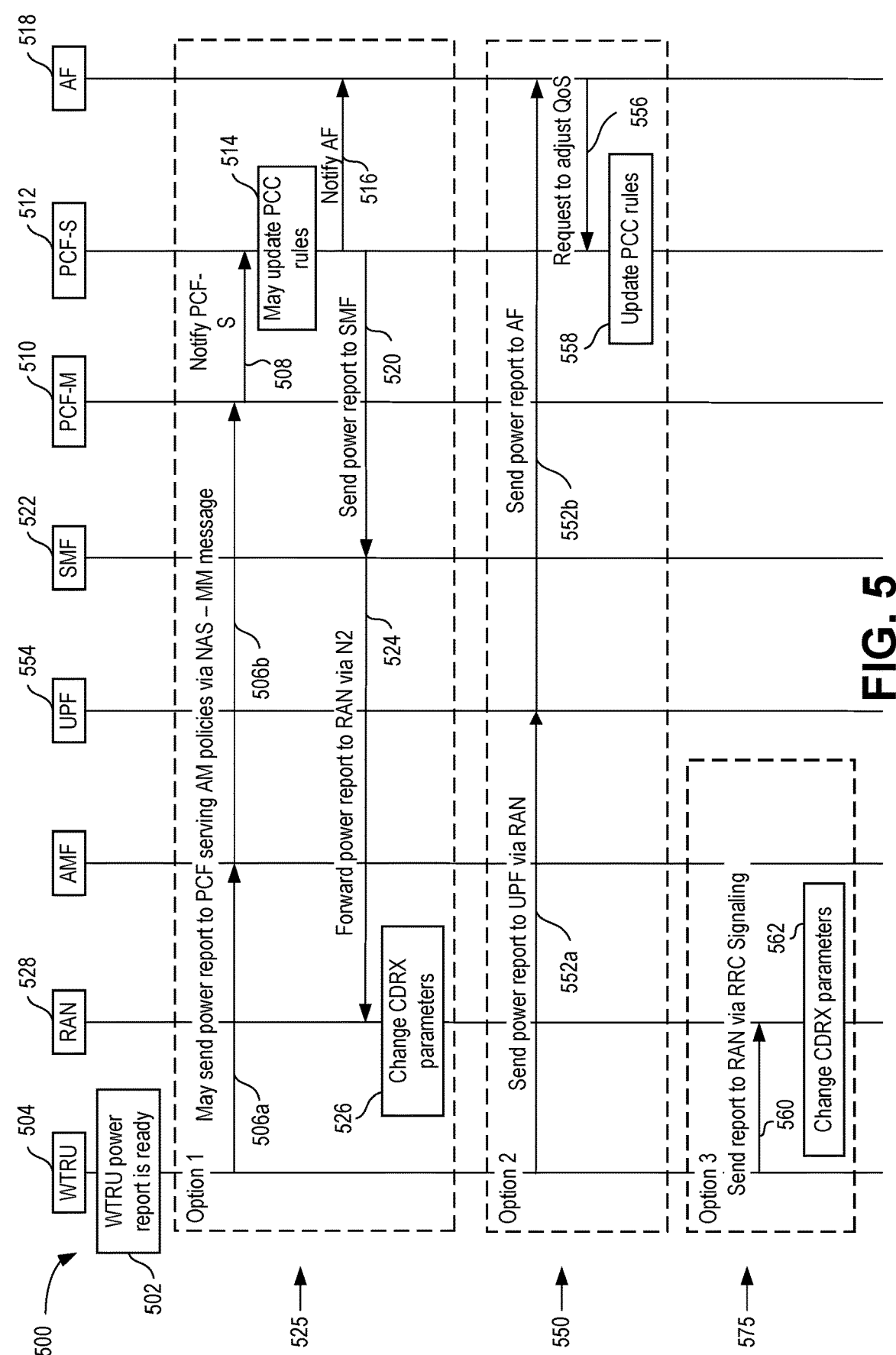
FIG. 5 illustrates example procedures for the WTRU to send a power report to the network.

FIG. 5 illustrates example procedures 500 for the WTRU to send a power report (e.g., power status report) to the network.

At 502, the WTRU 504 may have been configured with a power reporting policy, for example, using a Network-initiated and/or a WTRU-initiated WTRU power reporting policy provisioning procedure, as described herein. The WTRU 504 may be triggered (e.g., later at 502), to send a power report. As described herein, the WTRU 504 may determine that one or more triggering events have occurred based on policy. The WTRU 504 may prepare the power report according to the power reporting policy and/or may prepare to send the power report to the network (e.g., 5GS).

The following options for the WTRU 504 sending the power report may be configured by the network in the power report policy.

In a first option (e.g., at 525), the WTRU 504 may send (e.g., at 506a) the WTRU power report to the network (e.g., 5GS) via the control plane. At 506b, the WTRU 504 may send the power report to the PCF that is serving the WTRU for AM Policies (e.g., the PCF-M 510). The power report may be sent via a NAS-MM message.

At 508, the PCF serving the WTRU for AM Policies (e.g., PCF-M 510) may forward information from the power report to the PCF(s) that serve the WTRU's PDU Sessions (e.g., PCF-S 512) if those PCFs are interested (e.g., have subscribed for the power status notification).

The PCF (e.g., PCF-S 512) may perform one or more actions, for example, when the PCF that serves the PDU Session (e.g., the PCF-S 512) receives the power report. For example, at 514, the PCF may change (e.g., update) one or more PCC Rules. At 516, the PCF (e.g., PCF-S 512) may send a notification to an AF 518. At 520, the PCF (e.g., PCF-S 512) may send a power status indication to the SMF 522. At 524, the SMF 522 may forward the indication to the RAN 528 (e.g., via N2 messaging). For example, the SMF 522 may forward the indication to the RAN 528 such that the RAN 528 may make one or more adjustments (e.g., change one or more CDRX parameters at 526).

In a second option (e.g., at 550), the WTRU 504 may be configured to send the power report to the network (e.g., 5GS) via the user plane.

The WTRU 502 may send a user plane message including the power report to the AF 518. At 552a, the WTRU 504 may send a user plane message including the power report to the serving UPF 554. The user plane message may be application layer signaling. The user plane message may go directly (e.g., at 552b) to the AF 518 (e.g., through the UPF 554, the UPF 554 does not understand it).

At 556, after receiving the power report, the AF 518 may send a request to the PCF that serves the PDU Session (e.g., PCF-S 512) to ask that QoS be adjusted. For example, the network device may receive a request to adjust one or more QoS rules from the AF.

At 558, the PCF (e.g., PCF-S 512) may update and/or change one or more PCC Rules. The PCF (e.g., PCF-S 512) may update and/or change one or more PCC rules, for example, according to the AF request 556.

In Option 1 (e.g., at 525) and/or Option 2 (e.g., at 550), when the WTRU 504 is configured by the CN to send one or more (e.g., some) power reports, the one or more power reports may or may not be visible to the RAN 528. The WTRU 504 may include the one or more reports in a RAN-visible container when sending to the CN, for example, if the RAN 528 is expected to perform one or more (e.g., some) actions (e.g., change the WTRU state from CONNECTED to INACTIVE).

In a third option (e.g., at 575), the WTRU 504 may send the power report solely to the RAN 528.

At 560, the WTRU 504 may send the power report to the RAN via RRC signaling. Depending on the type of event(s) to report and/or one or more other IEs of the power reporting policy (e.g., such as frequency of reporting), the WTRU 504 may send one or more power related reports and/or indications to the RAN 528 (e.g., gNB) via UL MAC control element (CE) and/or uplink control information (UCI) messages, along with one or more RRC messages, which may be included as part of Access Stratum (AS) Layer signaling. As these one or more UL signaling messages may have different latencies (e.g., MAC CE may provide fast signaling communication exchange between the WTRU 504 and the gNB, compared to RRC), the WTRU 504 may be configured with one or more different periodicities and/or may send one or more power reports (e.g., dynamically) to the RAN 528.

At 562, the RAN 528 may use the power report to perform one or more actions. For example, the RAN 528 may change one or more CDRX Settings (e.g., change one or more CDRX parameters).

WTRU may be configured in the power reporting policy whether to send the power report using option 1 (e.g., at 525), option 2 (e.g., at 550), and/or option 3 (e.g., at 575).

The network may instruct the WTRU to perform one or more actions based on a power report. One way to configure the WTRU to perform the one or more actions based on the power report is to generate instructions for the WTRU. The one or more generated instructions for the WTRU may be associated with a specific service such as XRM. The generated instructions may include one or more URSP rules. The one or more URSP rules may have a power status entry (e.g., and/or other power report IE entry such as emulated power status) as a Traffic descriptor component for the URSP rule. The power status entry may be the WTRU power level. The 5GS (e.g., PCF) may generate one or more different URSP rules having one or more different RSDs for one or more (e.g., various) WTRU power levels.

One or more (e.g., some) parameters in the RSD may be changed. One or more (e.g., some) of the parameters that may be changed in the RSD may depend on the power report IE entry (e.g., WTRU power level). One or more parameters that may change, depending on the power report IE entry, may include the session and service continuity (SSC) Mode value and/or an Access Type preference. For example, if the WTRU power level is under 20%, the WTRU may be instructed to use a RSD in the URSP rule that has Wi-Fi as the preferred Access Type. If the WTRU power level is above 50%, for example, the WTRU may be instructed to use a RSD in the URSP rule that has 3GPP as the preferred Access type.

Figure 6:
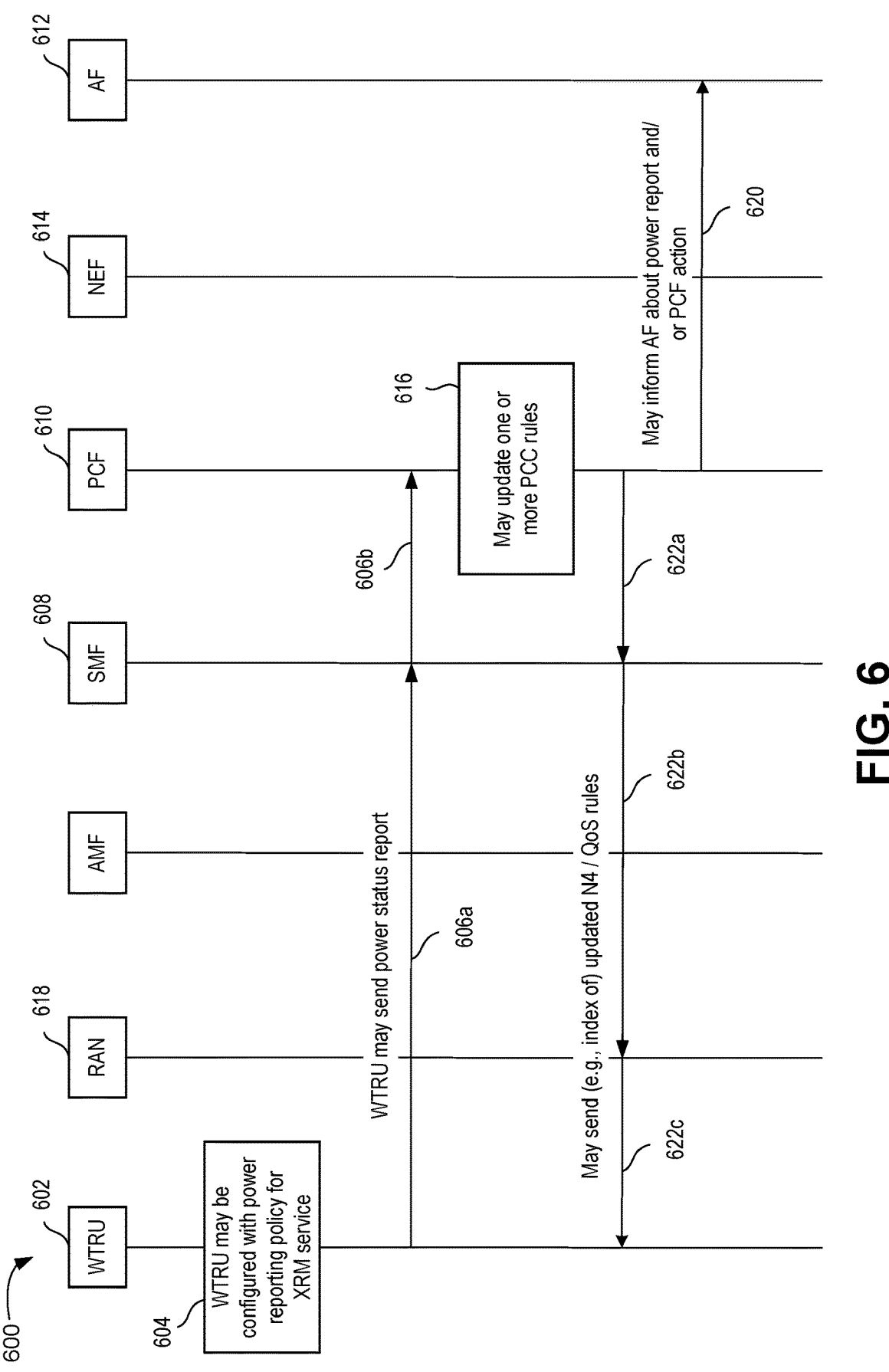
FIG. 6 illustrates an example procedure that shows which procedures may be initiated in the network based on the content of the power report from the WTRU.

FIG. 6 illustrates an example procedure 600 that shows which procedures may be initiated in the network based on the content of the power report from the WTRU.

At 604, the WTRU 602 may be configured with a power reporting policy for XRM service, as described herein.

At 606a, the WTRU 602 may send a power status report. The WTRU 602 may send the power status report when one or more conditions for reporting WTRU power status are met. The WTRU 602 may send power status information to the network (e.g., 5GS). The WTRU 602 may send power status information to the network (e.g., 5GS) either via a user plane or a control plane, as described herein. For example, the WTRU 602 may send the power status report to the SMF 608. At 606b, the SMF 608 may forward the received WTRU power report (e.g., at 606b) to the serving PCF 610. The WTRU 602 may send the power status information to the AMF and/or the AMF may send the power status information to the PCF 610.

At 616, the PCF 610 may receive the WTRU power report. Based on the power report content, the PCF 610 may perform one or more corresponding actions, including the following.

If the PCF 610 was provided one or more service requirements from the AF 612 and the WTRU 602 cannot meet the one or more service requirement(s) together with the power and/or battery level, together with service requirement(s) that cannot be met by WTRU, the PCF 610 may inform the AF 612 that the WTRU 602 cannot meet the one or more service requirements. The AF 612 may, in return, provide one or more other (e.g., new) service requirements along with power policy information to the PCF 610 via NEF 614. The PCF 610 may use these one or more other (e.g., new) requirements to update and/or generate one or more PCC rules and/or power reporting policies (e.g., if necessary). The PCF 610 may forward one or more corresponding N4 rules, QoS profiles, and/or QoS rules to the SMF 608 (e.g., at 622a), the RAN 618 (e.g., at 622b), and/or the WTRU 602 (e.g., at 622c), respectively. The PCF 610 may send the updated PCC rules to the same SMF or to a different SMF, for example, based on the XRM traffic, traffic description information, QoS parameters, and/or the PDU session that carries this traffic.

If the PCF 610 was provided one or more (e.g., multiple) services requirements from the AF 612 along with power status information (e.g., such as required, preferred power/battery level and/or mode), based on the WTRU power report, the PCF 610 may update the one or more enforced PCC rules, and/or may use one or more different QoS parameters, from the set provided by AF 612 before, to generate and/or enforce one or more other (e.g., new) PCC rules. If the PCF 610 has indexed these rules with certain index values, and PCF 610 has already provided the alternative N4 rules, QoS profiles, and/or QoS rules to the SMF 608 (e.g., at 622a), the RAN 610 (e.g., at 622b), and/or the WTRU 602 (e.g., at 622c), respectively, the PCF 610 may send the index value of the one or more other (e.g., new) rules to be used by the network (e.g., 5GS) and/or the WTRU 602. The PCF 610 may send the updated PCC rules to the same SMF or to a different SMF, for example, based on the XRM traffic, traffic description information, QoS parameters, and/or the PDU session that carries this traffic.

If the PCF 610 is (e.g., further) provided one or more alternative QoS parameters for a set of configurations that are known to the application, such as frame rate (e.g., which may take the values 60, 90, 120, and/or the like), based on the WTRU power report, the PCF 610 may change the configuration of choice (e.g., the frame rate). For example, the PCF 610 may change the frame rate from a 90 frames per second (fps) to a 60 fps, which may reduce the video modality throughput and/or the consumed WTRU power related to this modality. At 620, the PCF 610 may report to the AF 612 the index of the changed configuration, if the set of QoS requirements provided by AF 612 has been indexed by the PCF 610. Additionally or alternatively, in scenarios where multimodal flows are used, for example, one or more flows that are of low importance may be stopped. For example, an application where Audio, Video, and/or Haptic flows are used, if the battery level goes below a predetermined battery level threshold (e.g., 10%), haptic flow may be stopped. Stopping haptic flow when the battery level falls below a predetermined battery level threshold may result in further battery savings.

If the AF service requirement is for one or more modalities not to exceed a certain latency, for example 20 ms for video modality, the AF 612 may provide the following information. For low battery level, video modality may use a frame rate of either 60 fps or 90 fps. For moderate to high battery level, video modality may use a frame rate of 90 fps, 120 fps, or 240 fps.

In examples, if the video modality used is 240 fps, and/or the WTRU power report indicates moderate to high battery level, the 5GS/PCF 610 may continue using the 240 fps, or may use a frame rate of 120 fps (e.g., which may decrease the video throughput and/or possibly reduce WTRU power consumption for XRM service). The network may satisfy the latency requirement of 20 ms and/or may use (e.g., appropriate) frame rate(s) for the reported battery level, while reducing power consumption at the same time.

The PCF may use the WTRU power report, information from the AF 612, and/or one or more other network functions such as the NWDAF, to determine how to better plan handover for a WTRU. If different modalities are being forwarded to different WTRUs, the PCF may use the power reports from the WTRUs to better plan group handover for the XRM service.

Based on the WTRU power report, for example, the network (e.g., 5GS) may optimize power consumption by aligning delay tolerant traffic with the real time traffic. For example, the network (e.g., 5GS) may postpone non-guaranteed bit rate (GBR) traffic within a PDU session that carries XRM traffic, with the XRM traffic itself. If Non-GBR traffic is delay tolerant, for example, then postponing it to be sent in parallel with the XRM PDUs may help reduce power consumption. The PCF and/or SMF may decide to postpone non-XRM traffic with the XRM traffic. Additionally or alternatively, if one or more different XRM modalities are considered, the PCF and/or SMF may align (e.g., at least slightly align) PDUs, PDU sets, and/or bursts of one or more different modalities at certain times (e.g., make sure PDU Sets are received at within same time window of other modality), while trying to ensure that the modalities do not lose considerably in terms of synchronization.

The AF may provide the 5GS with information on whether PDUs of a PDU set are to be handled together. For example, one or more SSC modes may be selected to provide handle mobility and/or data flow during a PDU Session. For example, SSC mode 1 of PDU Set treatment may include, if a PDU is lost, the remaining PDUs of the PDU set are not delivered to the WTRU. SSC mode 2 may be defined as even if some PDUs, up to a certain percentage, are lost, the network still delivers the remaining PDUs of the PDU Set to the WTRU. Using this aspect, based on WTRU power report, the PCF may determine one or more of the following. The PCF may decide and/or recommend selecting SSC mode 1, if, for example, battery level is under a certain value and/or low, such that not sending the remaining PDUs of the PDU Set may save the WTRU power. The WTRU may save power since the WTRU receives less packets (e.g., which might decrease throughput and/or WTRU power consumption). The PCF may decide and/or recommend selecting SSC mode 2, to (e.g., still) send one or more remaining PDUs of a certain PDU Set even if a certain percentage, x, of PDUs is lost. The network and/or AF may recommend and/or decide to lower the percentage x, (e.g., the tolerance to PDU loss within a PDU Set) and/or (e.g., hence) the overall x of packets not to be sent to WTRU in this context may increase and/or increasing the packets not to be sent to the WTRU may save the WTRU power.

In examples, the WTRU may perform one or more (e.g., some) actions by requesting (e.g., directly requesting) an update of the required XR assets (e.g., by requesting a streamed video segment of lower data rate using the dynamic adaptive streaming over hyper text transfer protocol (HTTP) (DASH) protocol and/or by requesting lightweight XR assets for minimizing the rendering computation and/or the like). The network may be made aware that the WTRU requests an update of the required XR asset(s). For example, the AF may make the network aware of such request(s). The network may be made aware of such requests such that the network may be made aware that such events may take place. The WTRU may request an update of one or more changes on one or more (e.g., some) application traffic related information (e.g., XR assets). If the network authorizes such request(s), for example, the network may monitor one or more update changes (e.g., events when they take place). The network may notify the WTRU of the one or more events. For example, the network may configure the WTRU to notify the network when the WTRU requests such change(s) (e.g., that are power relevant and/or power aware).

These one or more direct WTRU requests may be handled separately from the network-based power consumption management described herein.

A network device may receive a message that indicates an identifier of a WTRU and/or one or more parameters associated with a power status of the WTRU. The network device may generate a power reporting policy, for example, based on the received message. The power reporting policy may include one or more triggers associated with sending a power status report. The network device may send the power reporting policy to the WTRU. The network device may receive the power status report from the WTRU in accordance with the power reporting policy. The power status report may include one or more battery characteristics associated with the WTRU. The network device may update one or more policy charging and control (PCC) rules based on the power status report.

The one or more triggers (e.g., to send or stop sending the power status report) may include one or more of: a battery level of the WTRU, an unplugged status of the WTRU, a temperature level of the WTRU, a time of day, a bitrate parameter, the power status information associated with the WTRU, a detection of a type of traffic, a start of the application, and/or a stop of the application. The one or more triggers may include a trigger for the WTRU to send the power status report based on a determination that the battery level of the WTRU is below a threshold. The one or more triggers for the WTRU may include a trigger for the WTRU to send the power status report based on a detection of a type of traffic. The one or more triggers may include a trigger for how often the WTRU is to send the power status report. The one or more triggers may include a trigger for the WTRU to stop sending the power status report based on one or more of: a detection of a change of power status; a determination that the WTRU is plugged and/or is charging; a time of day; and/or a determination that the battery level of the WTRU is at and/or above a threshold.

The network device may configure the WTRU for an extended and multimodal reality (XRM) service using the one or more parameters. The network node may determine to send the power reporting policy to the WTRU when the power reporting policy is created and/or based on a request received from the WTRU.

The network node may send a power status indication to a session management function (SMF) and/or to a radio access network (RAN) based on the power status report. The network device may send a report to an application function (AF) based on the power status report. The network device may send one or more updated rules to a user plane function (UPF) to update a protocol data unit session associated with the WTRU based on the power status report.

The network node may generate a first set of PCC rules based on one or more of: one or more XRM service requirements, one or more quality of service requirements (e.g., for XRM traffic), and/or power status information of the WTRU. The network node may send the first set of PCC rules to a SMF to generate a first set of one or more quality of service (QoS) rules to be sent to the WTRU. The WTRU may send a second set of PCC rules to the SMF (e.g., based on the XRM traffic/XRM traffic description information) to generate a second set of one or more QoS rules to be sent to the WTRU. For example, the WTRU may send the second set of PCC rules based on one or more of the following: the power status of the WTRU, one or more XRM service requirements, one or more QoS requirements, one or QoS requirements associated with XRM traffic, and/or the power status information (e.g., of the WTRU).

The network node may receive media codec information from an application function (AF). For example, the network node may receive one or more quality of service (QoS) values. The network node may generate one or more PCC rules for media traffic flow based on the received media codec information and/or based on a trade-off between quality of experience (QoE) and power consumption of the WTRU. Generating one or more PCC rules may be based on one or more of: a determination of one or more latency values; a determination of one or more of video modality, a battery level of the WTRU, XRM modality, and/or video throughput; and/or a determination to align delay tolerant traffic with real time traffic.

What is claimed is:

1. A wireless transmit/receive unit (WTRU) comprising a processor and a transceiver, wherein the processor is configured to:

receive, via the transceiver, a power reporting policy from a network node, wherein the power reporting policy comprises one or more triggers associated with sending a power status report, wherein the power reporting policy configures the WTRU for an extended and multimodal reality (XRM) service using one or more parameters associated with power status information of the WTRU;

determine that a trigger of the one or more triggers associated with sending the power status report has been satisfied; and send the power status report to the network node in accordance with the power reporting policy, wherein the power status report comprises the power status information associated with the WTRU and an indication that indicates the determined trigger to send the power status report.

2. The WTRU of claim 1, wherein the processor is further configured to send to the network node, via the transceiver, one or more of a battery level of the WTRU, a capacity of the battery of the WTRU, one or more characteristics of the battery of the WTRU, an indication of a time left to fully charge the battery of the WTRU, a temperature level of the battery of the WTRU, or a power mode of the WTRU.

3. The WTRU of claim 1, wherein determining that the trigger has been satisfied is based on or more of a type of traffic to be sent by the WTRU or a change of power status at the WTRU.

4. The WTRU of claim 1, wherein sending the power status report is based on one or more of: a battery level of the WTRU, an unplugged status of the WTRU, a temperature level of the WTRU, a time of day, a bitrate parameter, a start of an application, a stop of the application, the power status information associated with the WTRU, or a detection of a type of traffic.

5. The WTRU of claim 1, wherein the power reporting policy further comprises one or more triggers associated with stopping the power reporting policy, an indication of where the WTRU is to send the power status report, an indication of a type of content that the WTRU is to include in the power status report, or an indication of one or more actions to be taken by the WTRU based on the content of the power status report or based on the one or more triggers associated with sending the power status report.

6. The WTRU of claim 1, wherein the power reporting policy further comprises one or more triggers associated with stopping the power reporting policy, and wherein the processor is further configured to stop sending the power status report based on one or more of a detection of a change of power status, a determination that the WTRU is plugged or is charging, a time of day, or a determination that the battery level of the WTRU is at or above a threshold.

7. The WTRU of claim 1, wherein the processor is further configured to:

send, via the transceiver, the power status report to a location indicated by the power reporting policy; or send, via the transceiver, a request to the network node to receive the power reporting policy.

8. The WTRU of claim 1, wherein the processor is further configured to receive, via the transceiver, one or more quality of service (QoS) rules from a session management function (SMF).

9. The WTRU of claim 1, wherein the processor is further configured to determine how often to send the power status report.

10. A method performed by a wireless transmit/receive unit (WTRU), the method comprising:

receiving, via the transceiver, a power reporting policy from a network node, wherein the power reporting policy comprises one or more triggers associated with sending a power status report, wherein the power reporting policy configures the WTRU for an extended and multimodal reality (XRM) service using one or more parameters associated with power status information of the WTRU;

determining that a trigger of the one or more triggers associated with sending the power status report has been satisfied; and sending the power status report to the network node in accordance with the power reporting policy, wherein the power status report comprises the power status information associated with the WTRU and an indication that indicates the determined trigger to send the power status report.

11. The method of claim 10, wherein the method further comprises sending to the network node, via the transceiver, one or more of a battery level of the WTRU, a capacity of the battery of the WTRU, one or more characteristics of the battery of the WTRU, an indication of a time left to fully charge the battery of the WTRU, a temperature level of the battery of the WTRU, or a power mode of the WTRU.

12. The method of claim 10, wherein determining that the trigger has been satisfied is based on or more of a type of traffic to be sent by the WTRU or a change of power status at the WTRU.

13. The method of claim 10, wherein sending the power status report is based on one or more of: a battery level of the WTRU, an unplugged status of the WTRU, a temperature level of the WTRU, a time of day, a bitrate parameter, a start of an application, a stop of the application, the power status information associated with the WTRU, or a detection of a type of traffic.

14. The method of claim 10, wherein the power reporting policy further comprises one or more triggers associated with stopping the power reporting policy, an indication of where the WTRU is to send the power status report, an indication of a type of content that the WTRU is to include in the power status report, or an indication of one or more actions to be taken by the WTRU based on the content of the power status report or based on the one or more triggers associated with sending the power status report.

15. The method of claim 10, wherein the power reporting policy further comprises one or more triggers associated with stopping the power reporting policy, and wherein the method further comprises stopping the sending of the power status report based on one or more of a detection of a change of power status, a determination that the WTRU is plugged or is charging, a time of day, or a determination that the battery level of the WTRU is at or above a threshold.

16. The method of claim 10, wherein the method further comprises:

sending, via the transceiver, the power status report to a location indicated by the power reporting policy; or sending, via the transceiver, a request to the network node to receive the power reporting policy.

17. The method of claim 10, wherein the method further comprises receiving, via the transceiver, one or more quality of service (QoS) rules from a session management function (SMF).

18. The method of claim 10, wherein the method further comprises determining how often to send the power status report.

\* \* \* \* \*